Jan. 28, 1958 W. N. KNUTSEN ET AL 2,821,617
MODULE ASSEMBLER
Filed Aug. 17, 1956 23 Sheets-Sheet 2

INVENTORS
Charles C. Rayburn
James G. Black Jr.
BY Herman A. Schmidt
Wallace N. Knutsen Donald P. Smith
Attorney Jan. 28, 1958 W. N. KNUTSEN ET AL 2,821,617
MODULE ASSEMBLER
Filed Aug. 17, 1956 23 Sheets-Sheet 7

INVENTORS
Charles C. Rayburn
James G. Black Jr.
BY Herman A. Schmidt
Wallace N. Knutsen
Donald P. Smith
Attorney

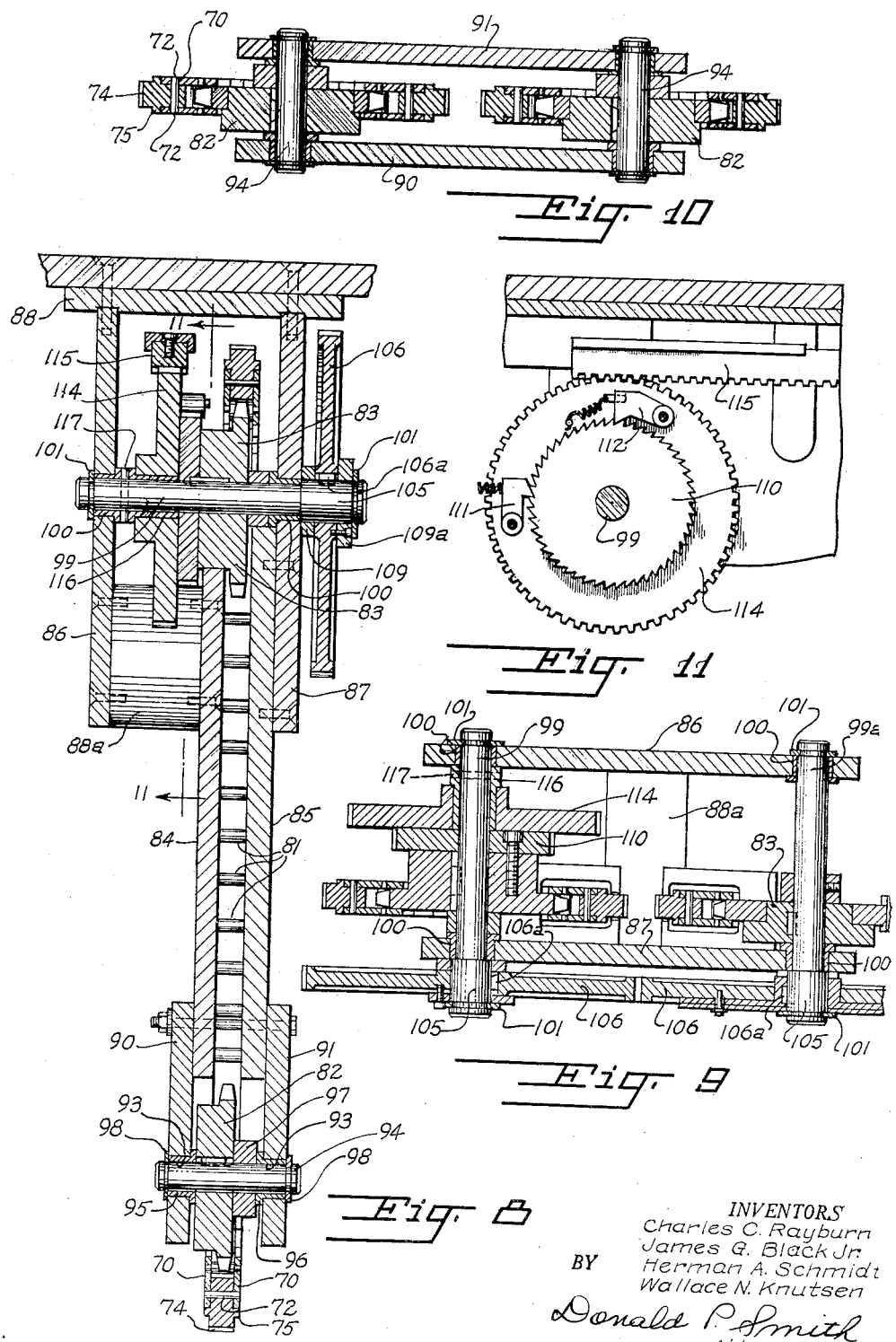

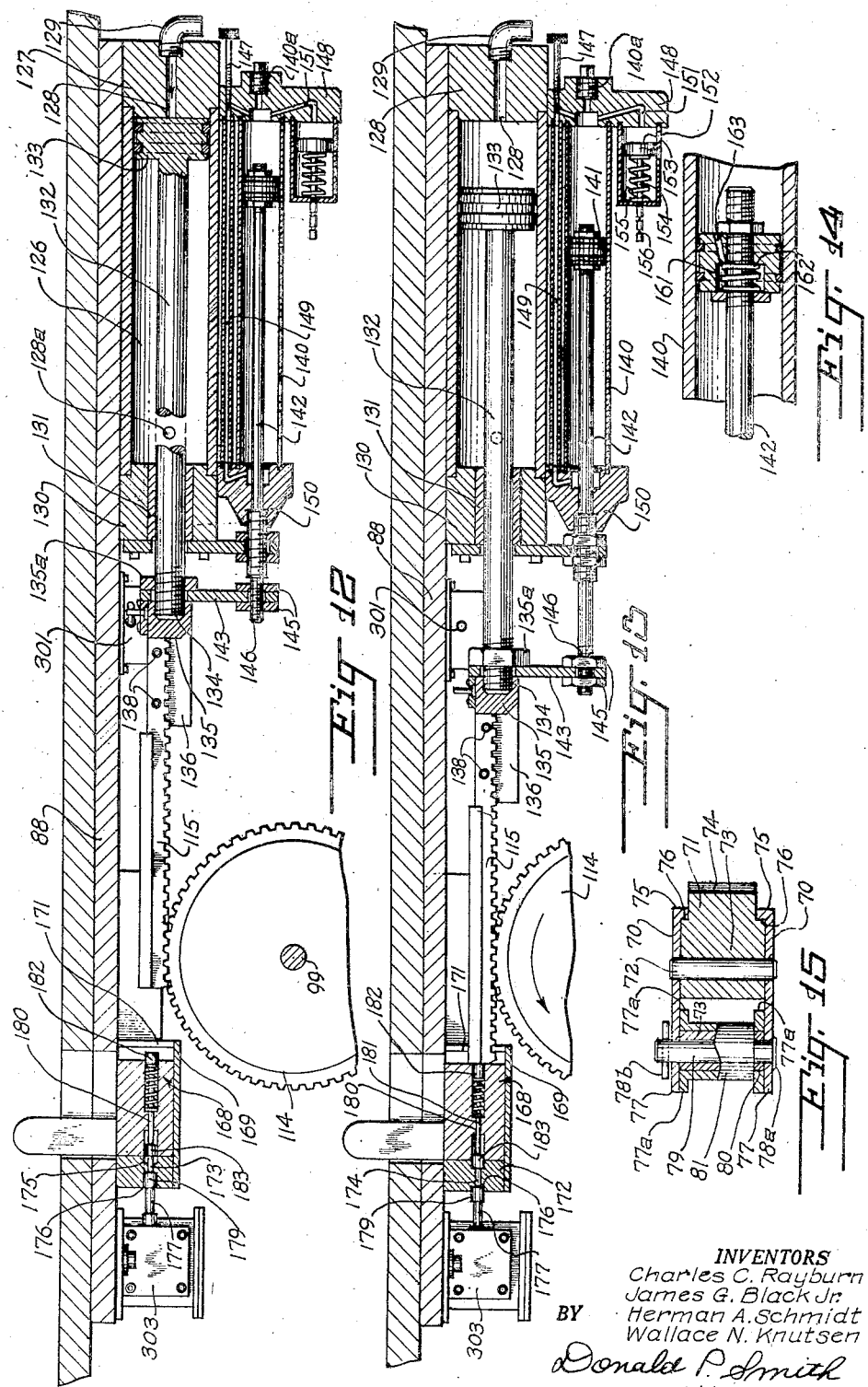

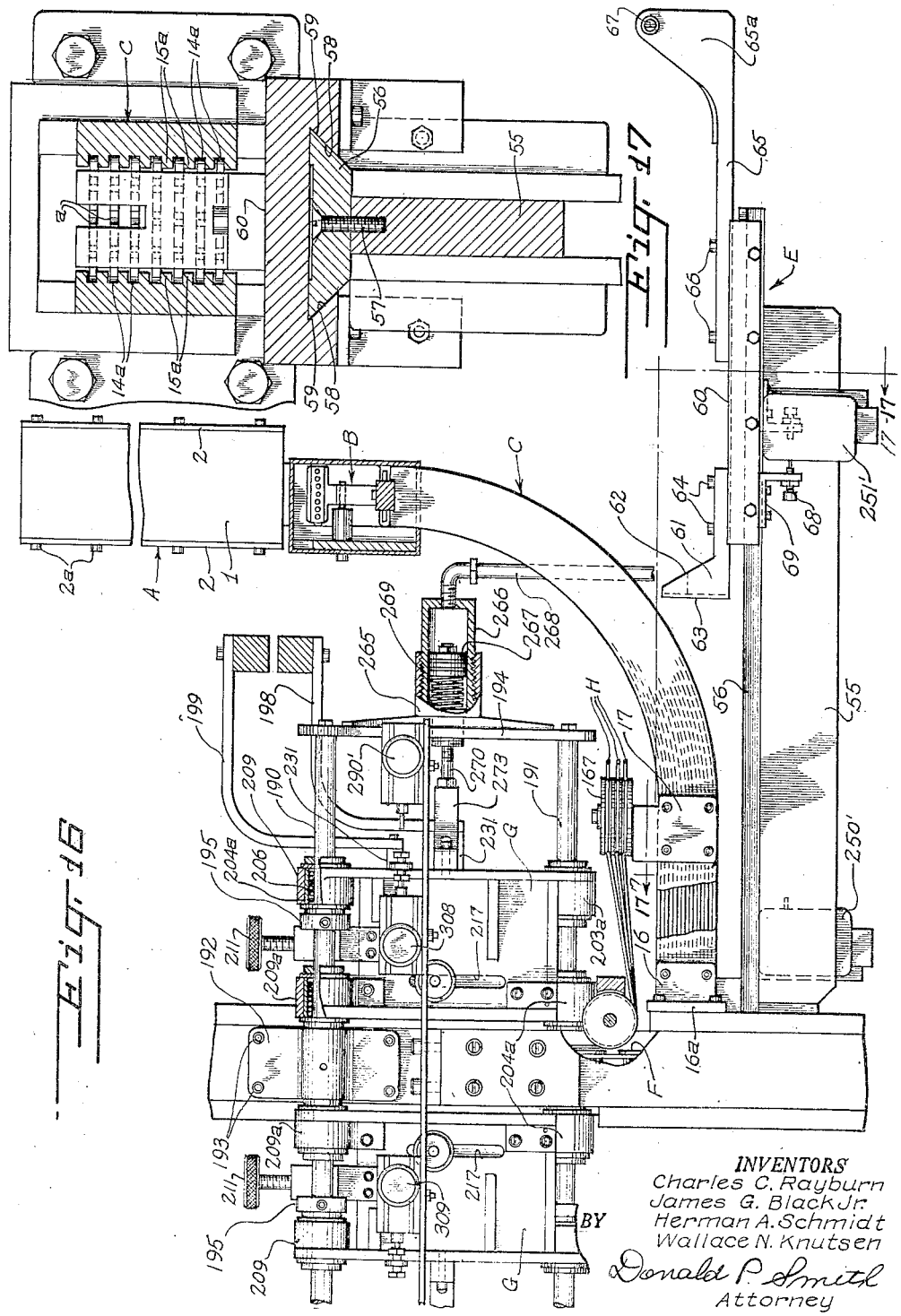

Jan. 28, 1958 W. N. KNUTSEN ET AL 2,821,617
MODULE ASSEMBLER
Filed Aug. 17, 1956 23 Sheets-Sheet 11
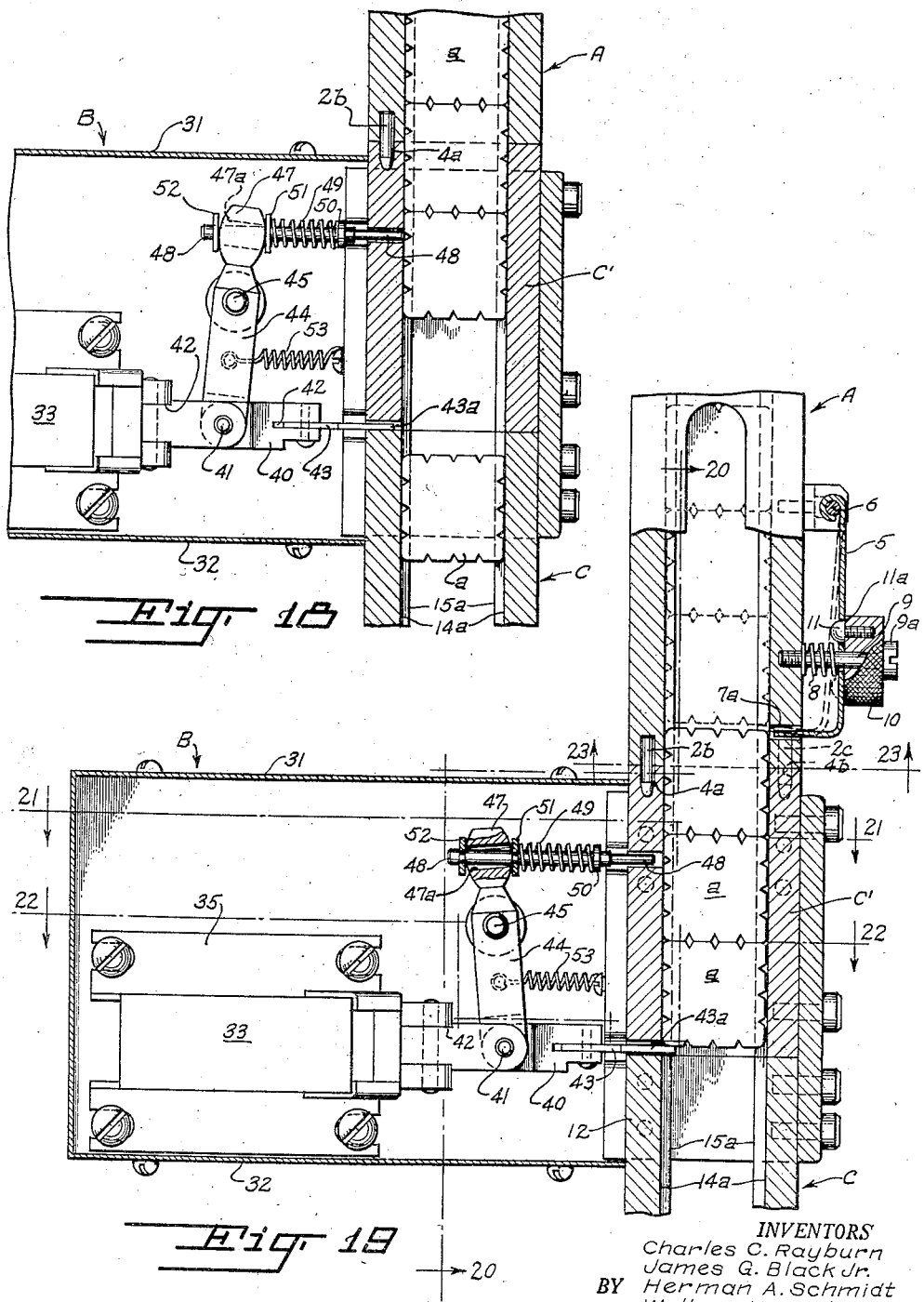
INVENTORS
Charles C. Rayburn
James G. Black Jr.
BY Herman A. Schmidt
Wallace N. Knutsen
Donald P. Smith
Attorney Jan. 28, 1958     W. N. KNUTSEN ET AL     2,821,617
MODULE ASSEMBLER
Filed Aug. 17, 1956     23 Sheets-Sheet 12
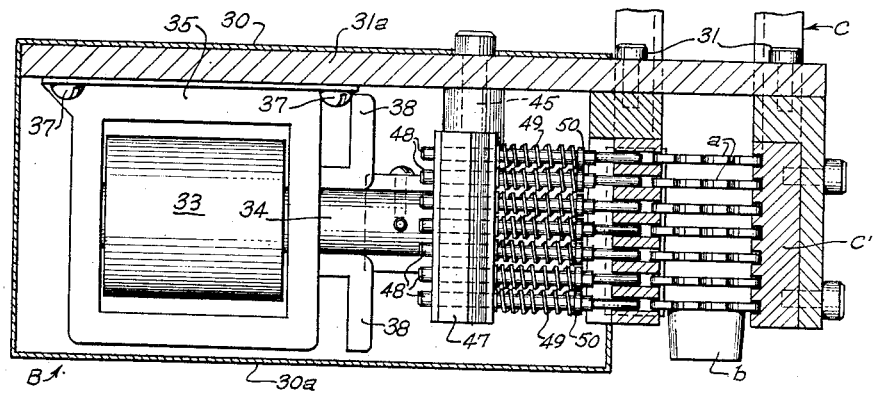
Fig. 21
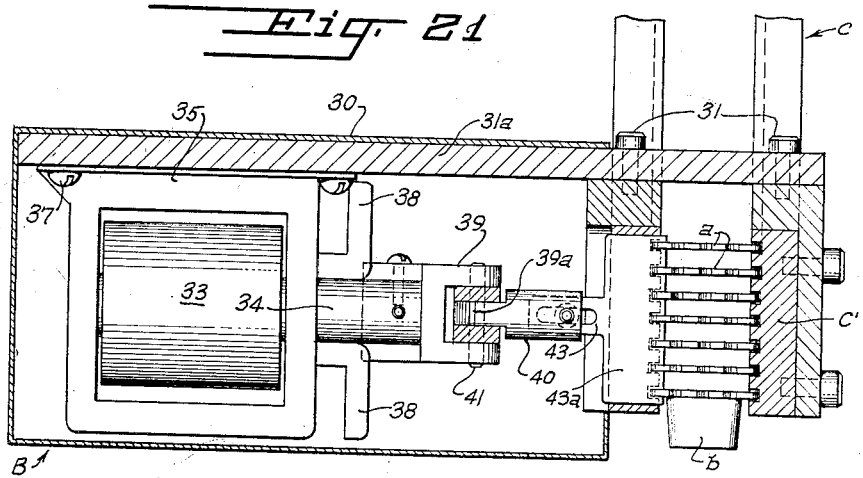
Fig. 22
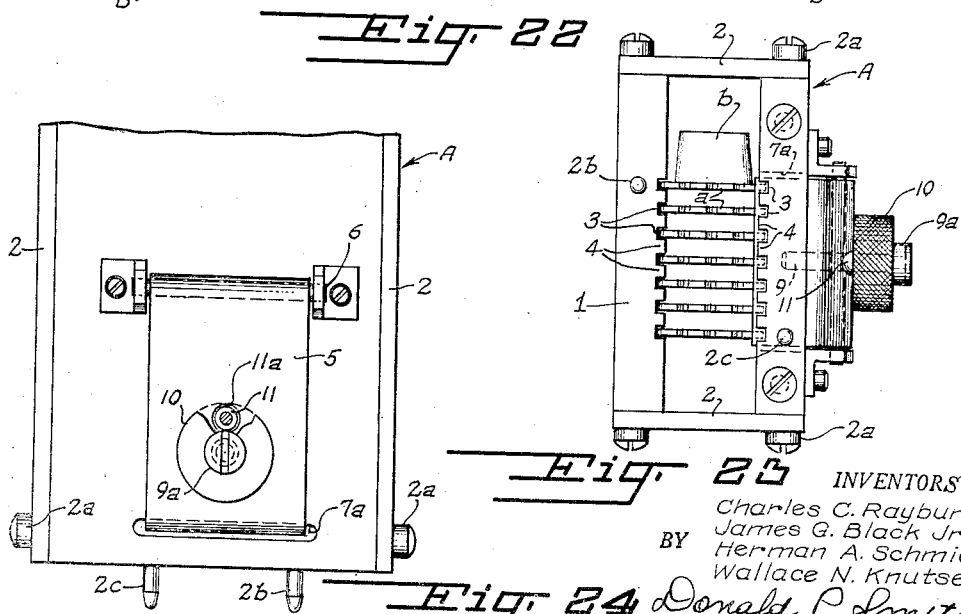
Fig. 23
Fig. 24
INVENTORS
Charles C. Rayburn
James G. Black Jr
Herman A. Schmidt
Wallace N. Knutsen
BY Donald P. Smith
Attorney

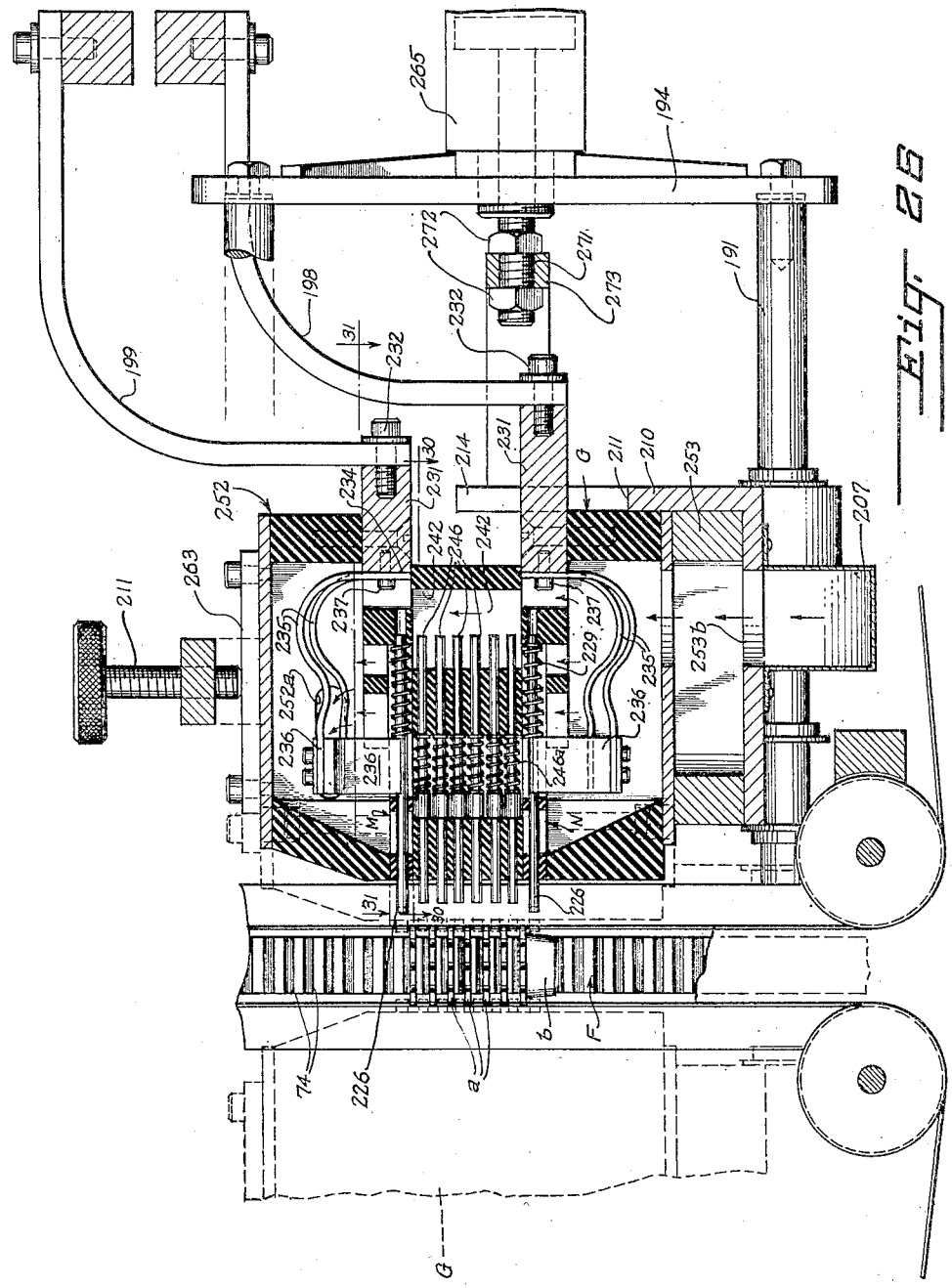

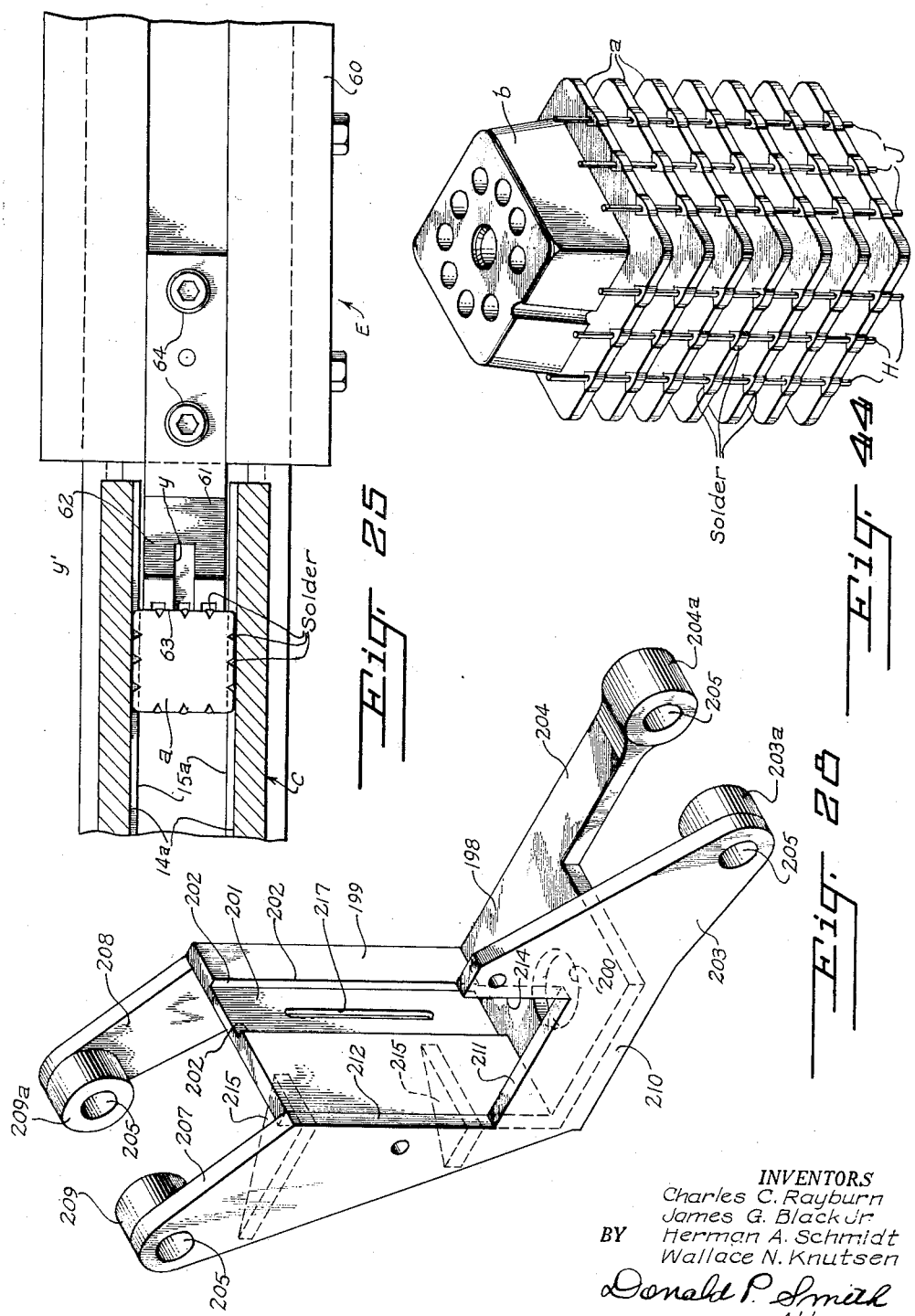

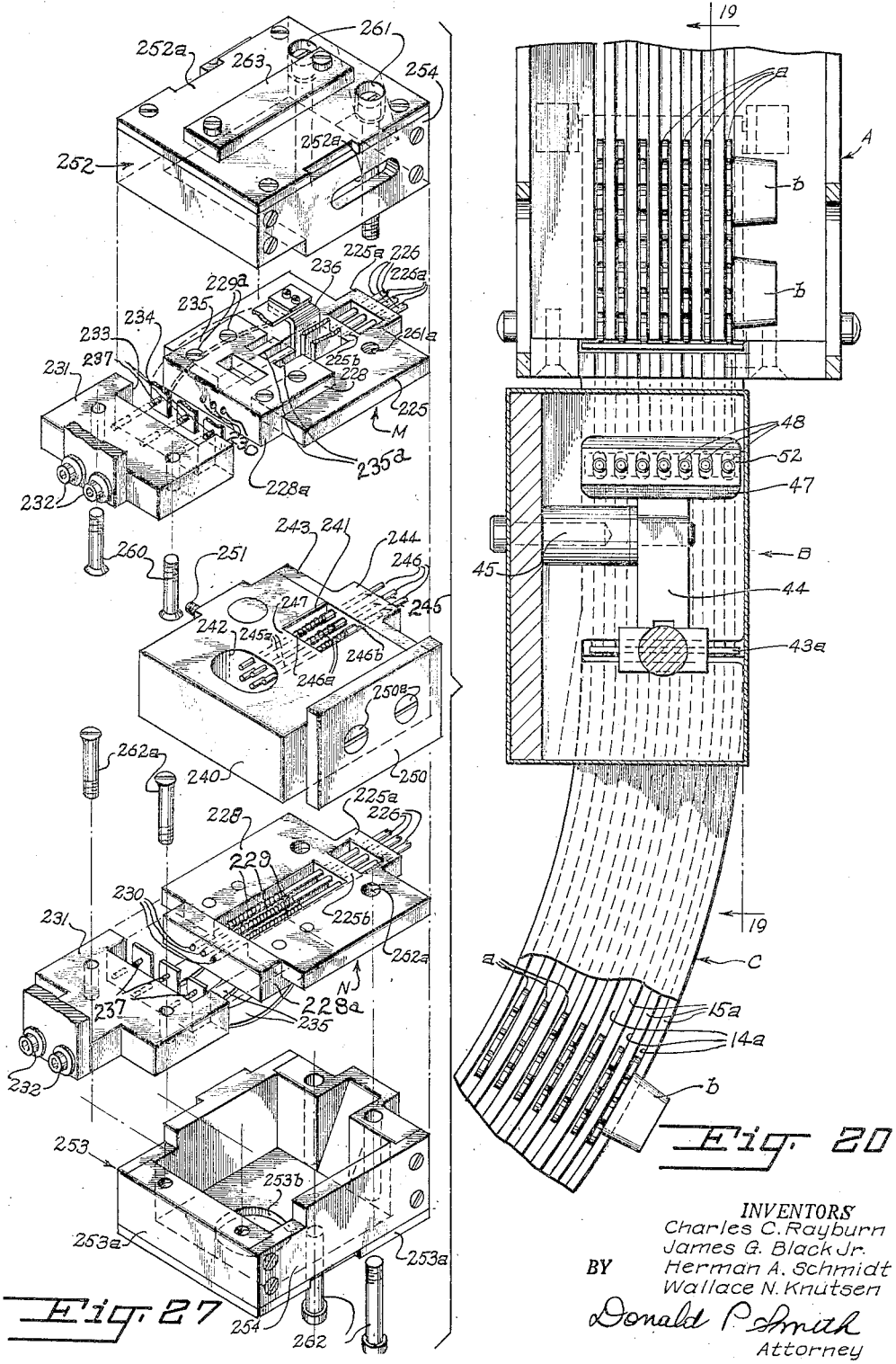

Jan. 28, 1958  W. N. KNUTSEN ET AL  2,821,617
MODULE ASSEMBLER
Filed Aug. 17, 1956  23 Sheets-Sheet 16
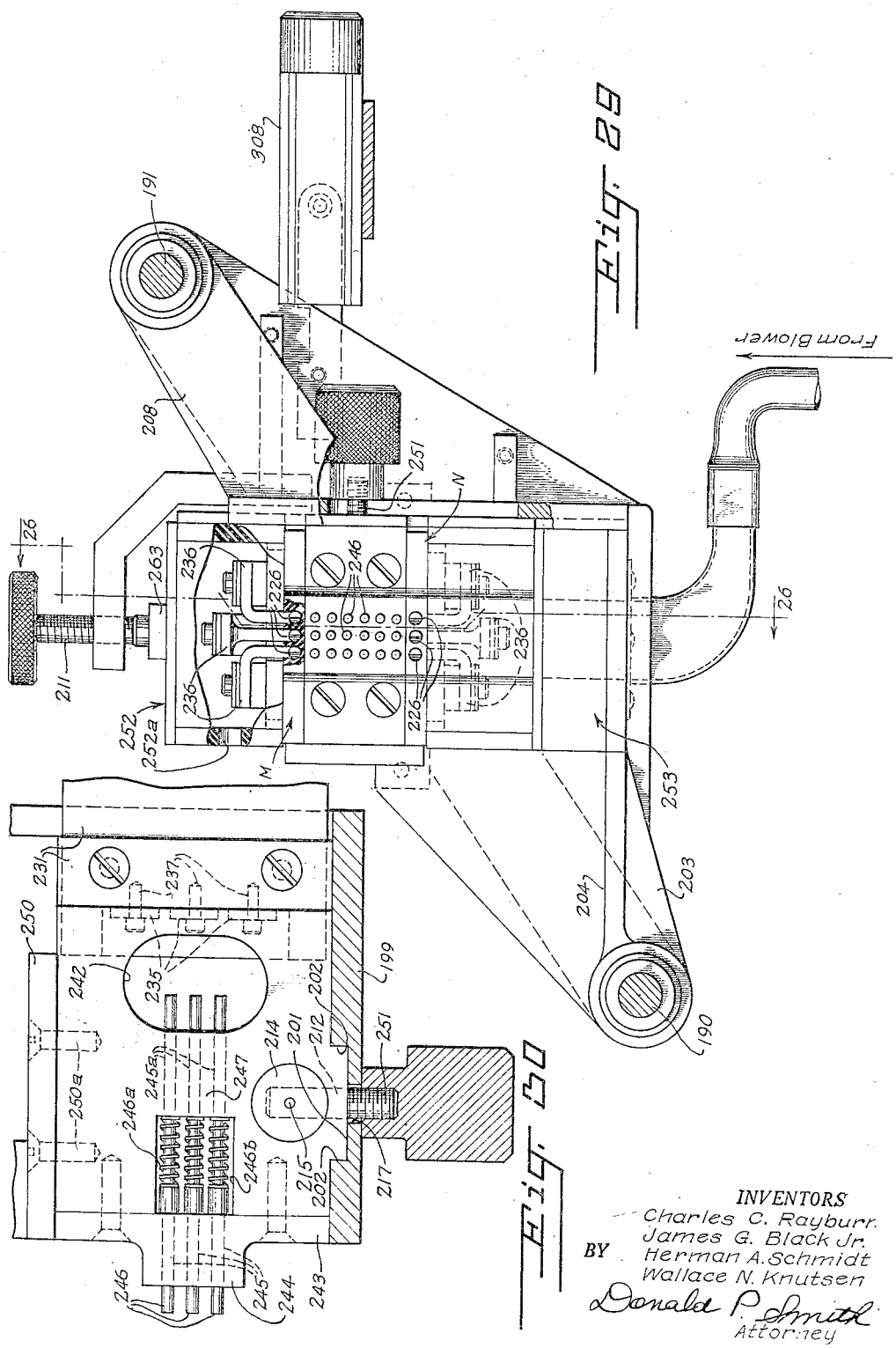
INVENTORS
Charles C. Rayburn.
James G. Black Jr.
Herman A. Schmidt
Wallace N. Knutsen
BY
Donald P. Smith
Attorney

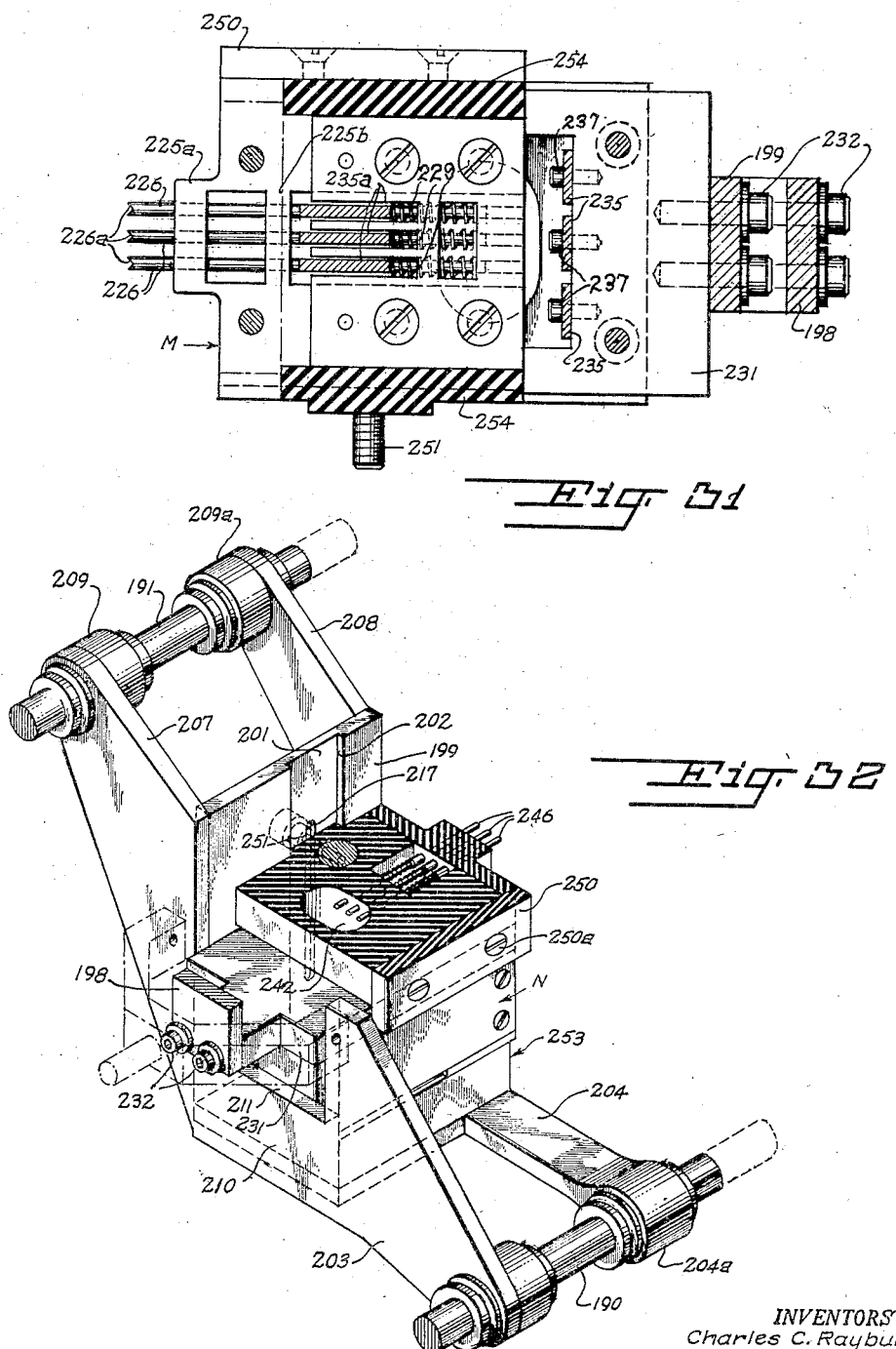

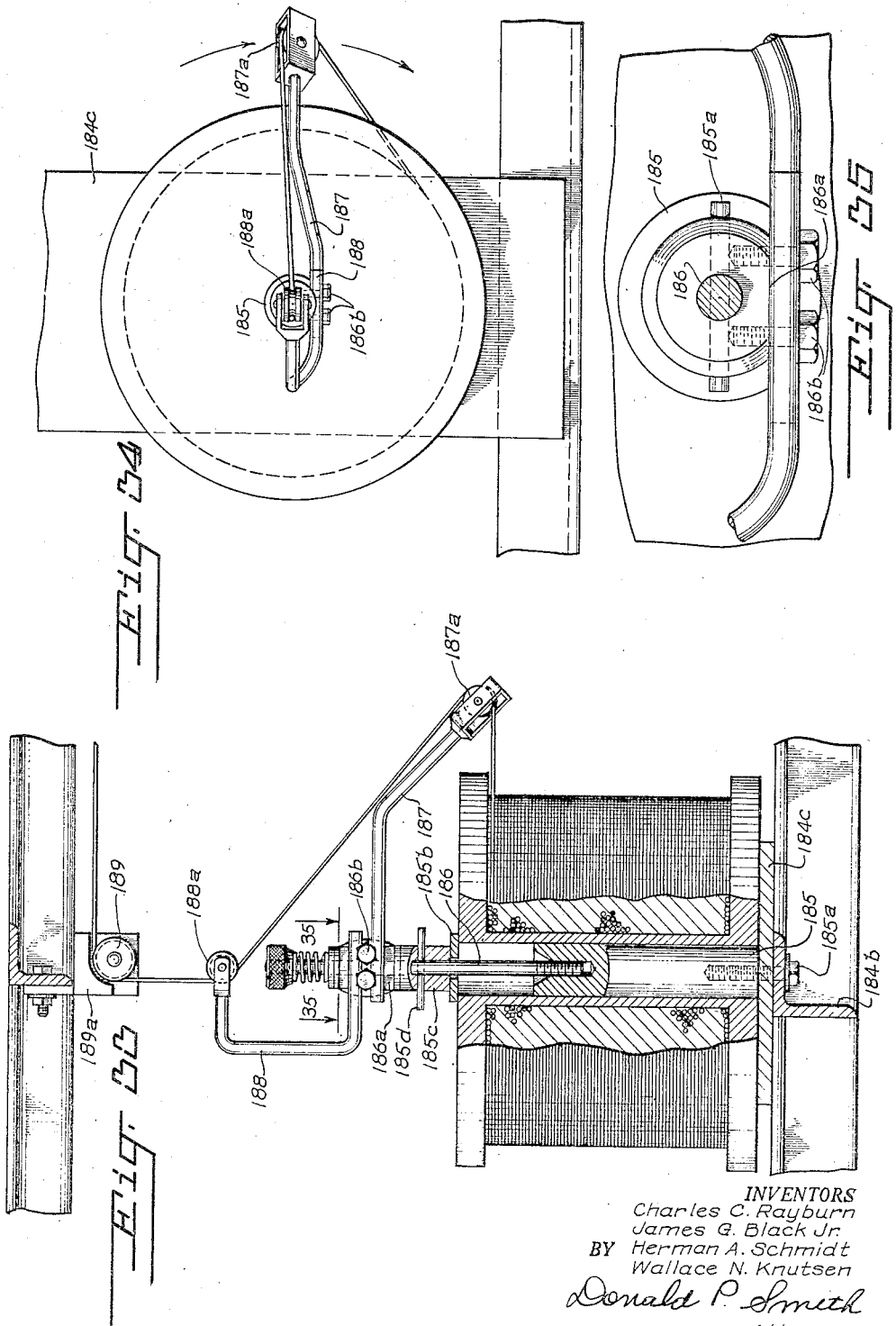

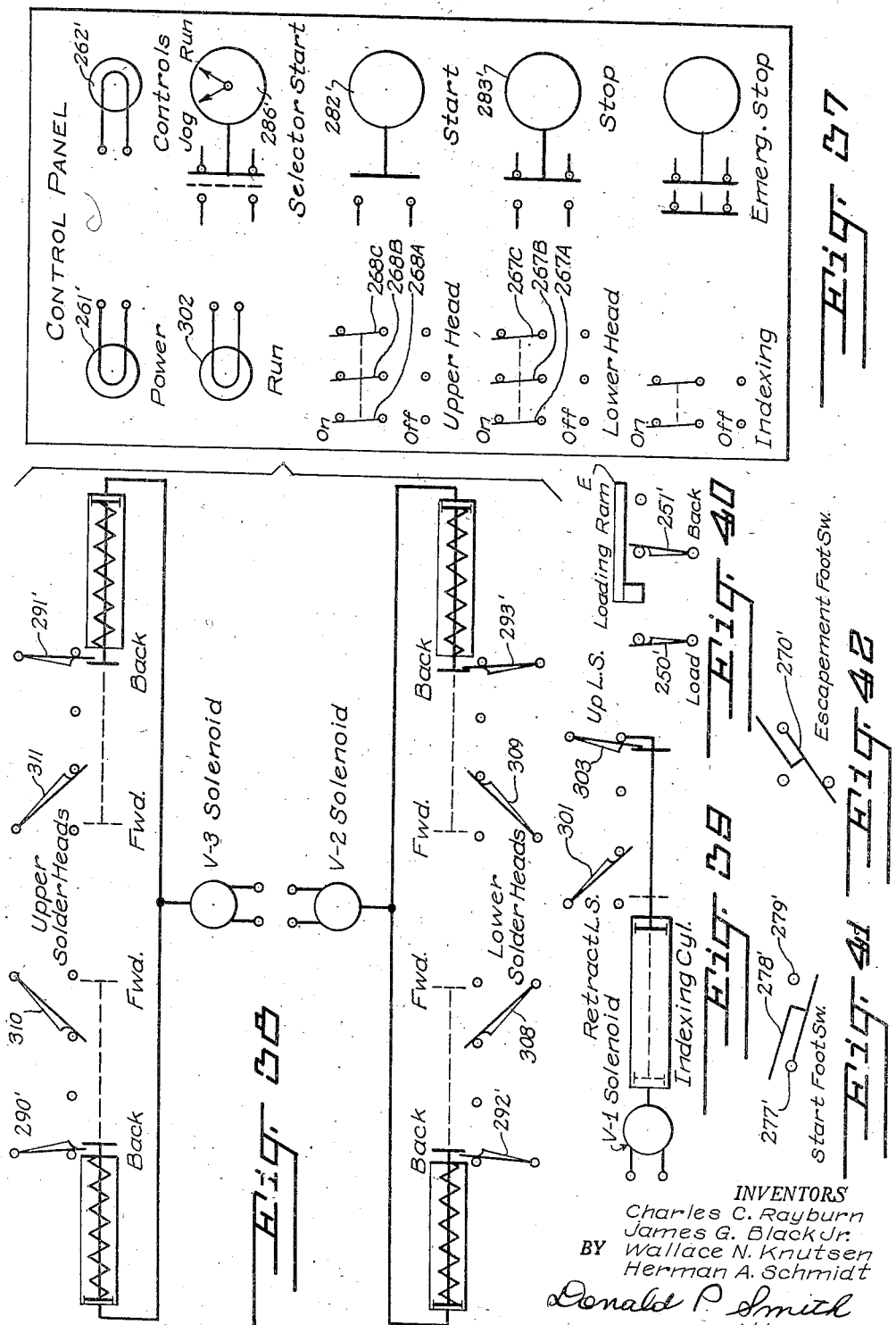

Jan. 28, 1958

W. N. KNUTSEN ET AL 2,821,617

MODULE ASSEMBLER

Filed Aug. 17, 1956

INVENTORS
Charles C. Rayburn
James G. Black Jr.
BY Herman A. Schmidt
Wallace N. Knutsen Donald P. Smith
Attorney INVENTORS
Charles C. Rayburn
James G. Black Jr.
Herman A. Schmidt
Wallace N. Knutsen
BY Donald P. Smith
Attorney INVENTORS
Charles C. Rayburn
James G. Black Jr.
BY  Herman A. Schmidt
Wallace N. Knutsen Donald P. Smith
Attorney Jan. 28, 1958  W. N. KNUTSEN ET AL  2,821,617
MODULE ASSEMBLER
Filed Aug. 17, 1956  23 Sheets-Sheet 23
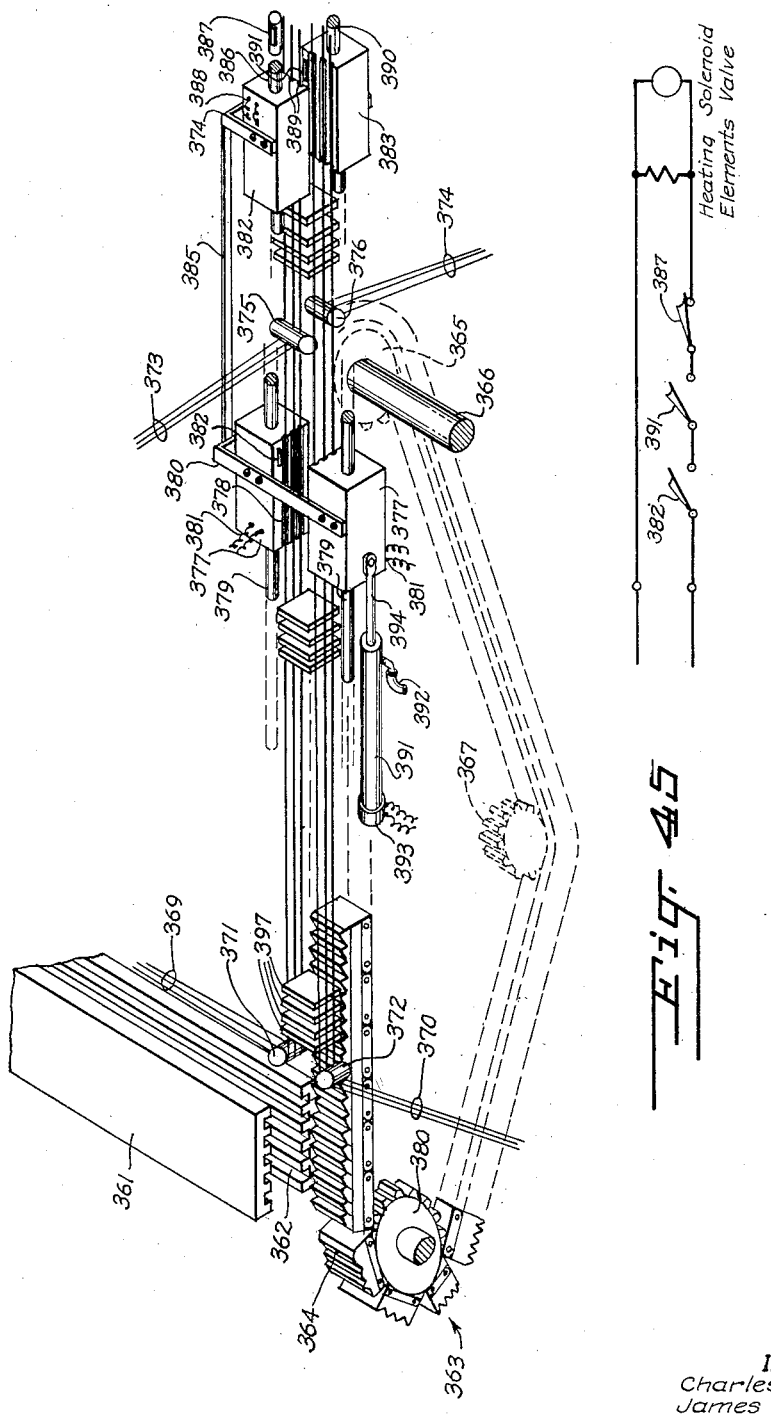
INVENTORS
Charles C. Rayburr.
James G. Black Jr.
BY Herman A. Schmidt
Wallace N. Knutsen
Donald P. Smith
Attorney

United States Patent Office 2,821,617
Patented Jan. 28, 1958

2,821,617

MODULE ASSEMBLER

Wallace N. Knutsen, Alexandria, and Charles C. Rayburn and James G. Black, Jr., Falls Church, Va., and Herman A. Schmidt, Washington, D. C., assignors to ACF Industries, Incorporated, New York, N. Y., a corporation of New Jersey Application August 17, 1956, Serial No. 604,752

60 Claims. (Cl. 219—85)

This invention relates to an apparatus for automatically assembling modules.

In the assembly of a module, the basic element of the construction is the ceramic wafer which serves as an insulating base upon which various elements of electrical impedance can be mounted by conductive coatings directly adhering to its surface. In general the conductive coatings terminate at predetermined notches in the peripheral edges of a wafer. These notches must in turn be connected to corresponding notches in other wafers so as to complete a circuit containing a multiplicity of impedance elements. In a conventional module construction it is the practice to so connect corresponding notches of a spaced stack of wafers by riser wires disposed perpendicularly to the surface of the wafer and attached, by soldering, to corresponding notches on each wafer of a stack. These riser wires serve not only to complete electrical connection between the array of wafers, but also to act as mechanical supports by which the wafers are held in uniformly spaced parallel relation to each other as a mechanically rugged and dependable unit of electrical circuitry.

In the mass assembly of the module containing a number of wafers, the problem of attaching the riser wires rapidly and dependably is paramount. It is thus a purpose of the present invention to provide a machine by which the assembly of wafers into a module can be accomplished rapidly, with a minimum of attention from an operator.

One of the main objects of this invention is to provide mechanism for feeding individual ceramic wafers into stacks, each stack having a predetermined number of wafers arranged in spaced superimposed relation for the application of riser wires which are soldered thereto at predetermined intervals as comprehended by spaced aligned tinned notches.

Another of the main objects of the invention is the provision of a feeding mechanism which delivers the wafers in spaced parallel association in predetermined groups as required in the formation of module assemblies of predetermined design.

Another object of the invention is the provision of conveying means which receive and retain the wafers as delivered by the feeding mechanism for association with riser wires forming conductors for delivery to soldering stations.

This invention also comprehends a mechanism for moving the soldering heads from operative to inoperative position sequentially with respect to the wafer delivering mechanism.

It is another object of the invention to provide separate groups of soldering mechanisms which operate on certain of the conductors or riser wires for securing them to the tinned notches at intervals, as prescribed by an automatic feeding mechanism.

This invention further comprehends the use of means for delivering the conductor wires from spools, whereby a plurality of groups of wafers forming module assemblies will be delivered from the machine.

This invention has for a further object the construction and arrangement of parts and controls therefor, whereby the initial threading of the conductor wire and feeding of the wafers can be manually controlled prior to the automatic operation.

These and further objects of the invention will more clearly hereinafter appear by reference to the accompanying drawings forming a part of the instant specification, and wherein like characters of reference designate corresponding parts throughout the several views, in which:

Fig. 8 is a vertical section on line 8—8 of Fig. 7 showing the conveyor supporting structure and the drive mechanism;

Fig. 9 is a section on line 9—9 of Fig. 8;

Fig. 10 is a section on line 10—10 of Fig. 8;

Fig. 11 is a partial elevation of a portion of the indexing mechanism;

Fig. 12 is a horizontal section of the indexing mechanism in retracted position;

Fig. 13 is a similar view of the indexing mechanism in its forward position;

Fig. 14 is an enlarged view showing passages of the retarding mechanism;

Fig. 15 is a section taken on line 15—15 of Fig. 7;

Fig. 16 is an elevation partly in section showing the feed mechanism for the wafers;

Fig. 17 is a section taken on line 17—17 of Fig. 16;

Fig. 18 is a sectional view showing the escapement mechanism in a position releasing a group of wafers;

Fig. 19 is a similar view showing the escapement mechanism in a position supporting the column of wafers;

Fig. 20 is an elevation partly in section showing a back view of the escapement mechanism;

Fig. 21 is a horizontal section on line 21—21 of Fig. 19;

Fig. 22 is a section on line 22—22 of Fig. 19;

Fig. 23 is a bottom view of the supply magazine;

Fig. 24 is an elevation showing the holding mechanism for the supply magazine;

Fig. 25 is a fragmentary view partly in section showing the ram mechanism;

Fig. 26 is a transverse section through one of the soldering heads;

Fig. 27 is an exploded view showing a soldering head assembly;

Fig. 28 shows a cradle structure supporting one of the soldering heads;

Fig. 29 is a front elevation of the soldering head;

Fig. 30 is a section on line 30—30 of Fig. 26;

Fig. 31 is a section on line 31—31 of Fig. 26;

Fig. 32 is a perspective view of a soldering head assembly partly in section;

Fig. 33 is an enlarged view partly in section showing a supply spool mounting;

Fig. 34 is a top plan of the spool mounting;

Fig. 35 is an enlarged detail of the distributor head for the spool;

Fig. 37 is a diagram of the face of the control panel;

Fig. 38 is a wiring diagram for the soldering heads;

Fig. 39 is a wiring diagram for the indexing mechanism;

Fig. 41 is a diagram of the foot controlled starting switch;

Fig. 42 is a diagram of the escapement control for the foot switch;

Fig. 43 is a diagram of the pneumatic control;

Figs. 43A, 43B and 43C are diagrams of details of the pneumatic control;

Fig. 44 is a perspective view of a module structure;

Fig. 45 is a schematic view of another embodiment of the invention; and

Fig. 46 is a schematic diagram of the controls of the species of Fig. 45.

Figure 2:
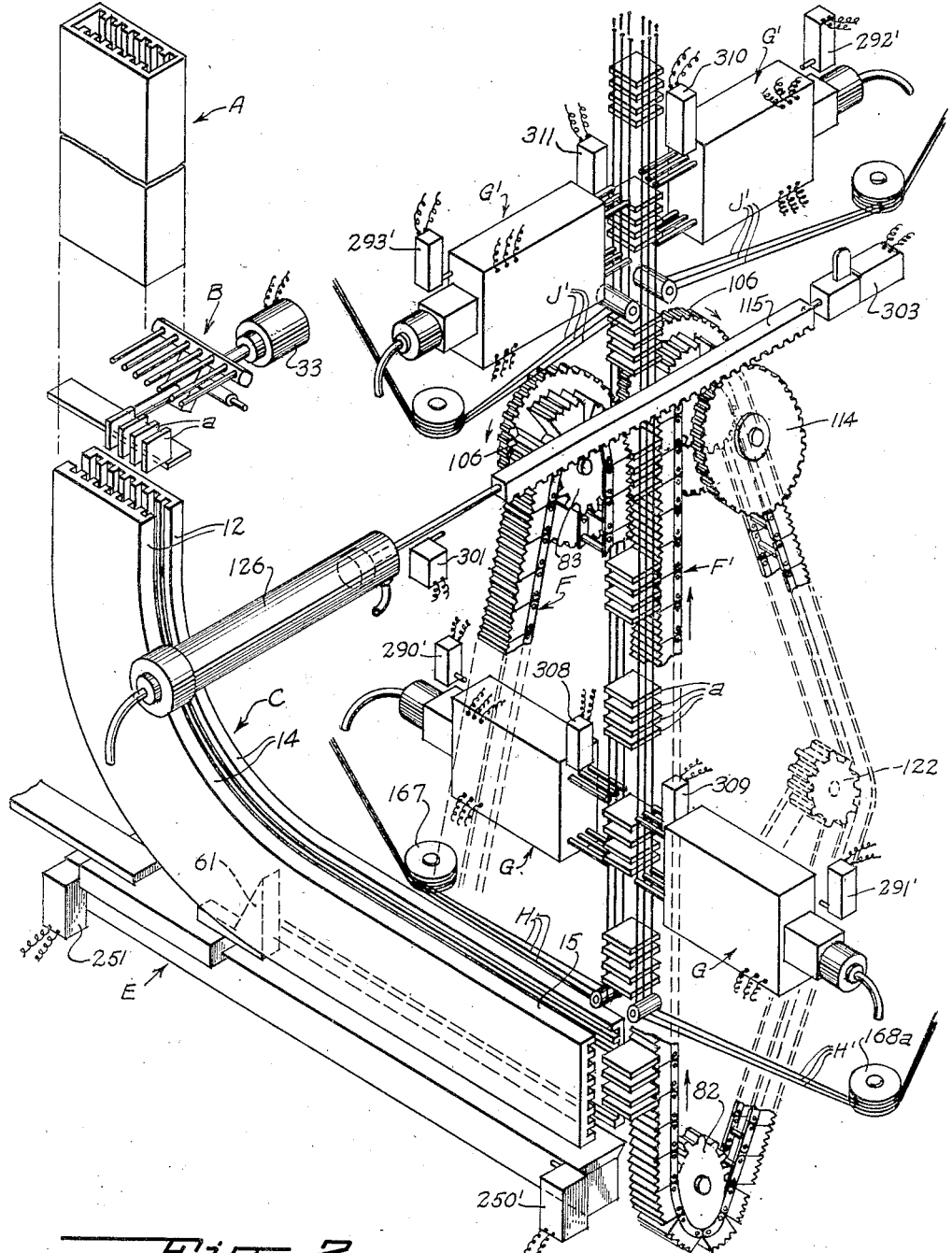
Fig. 2 is a schematic view of the operating mechanism of the machine.
Figure 3:
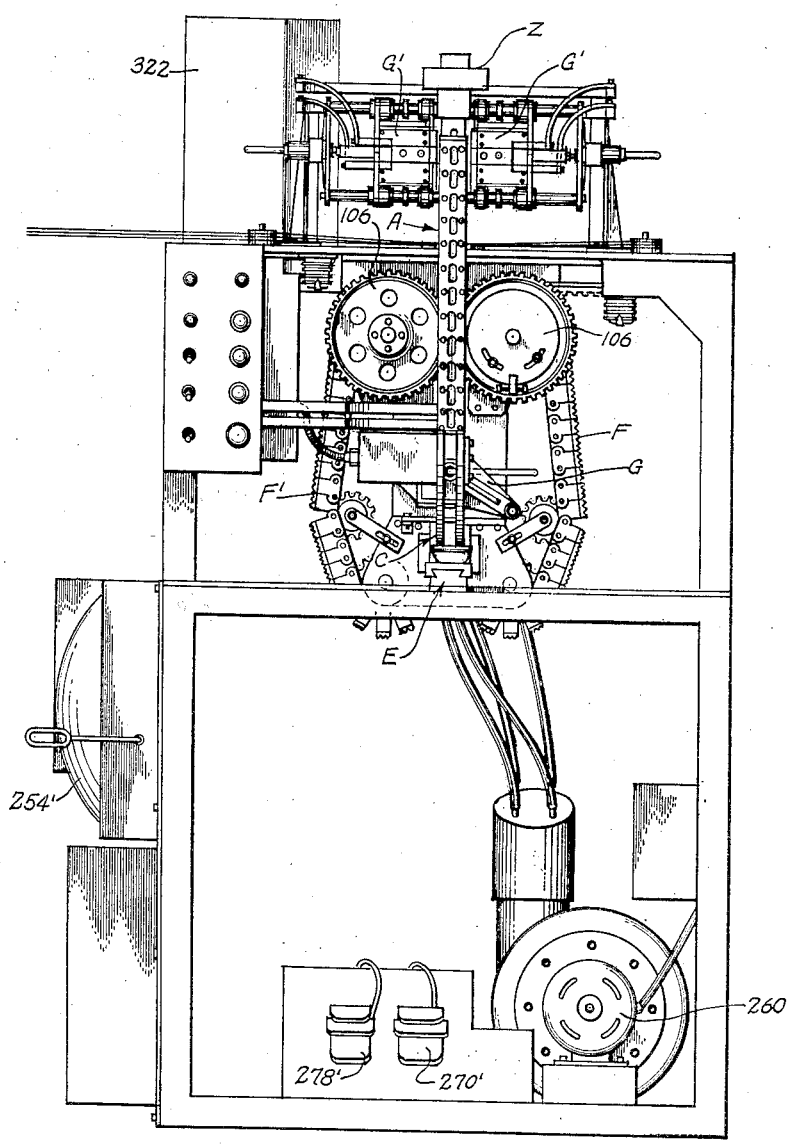
Fig. 3 is a front elevation of the machine.
Figure 4:
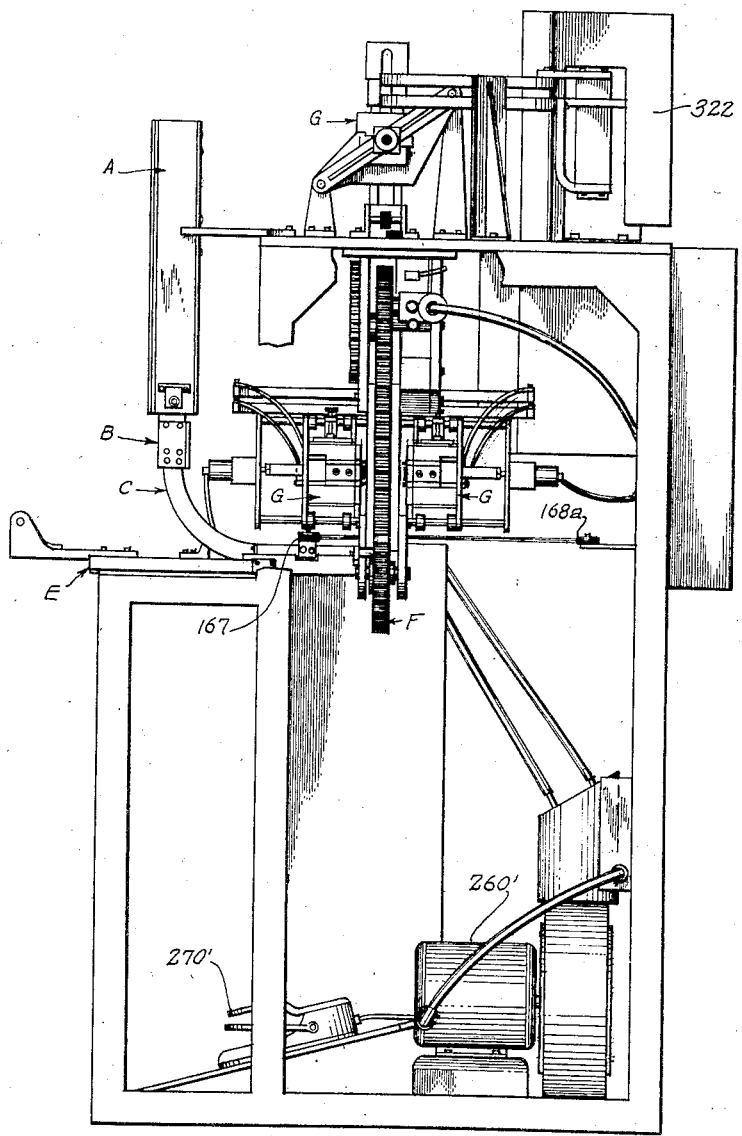
Fig. 4 is an end elevation of the machine.

Generally the present embodiment is illustrated in the diagrammatic view shown in Fig. 2 and includes a loading magazine A in which the ceramic wafers $a$ (Fig. 19) are arranged in accordance with predetermined values. These ceramic wafers $a$ are released by the escapement B to to channelway or guide chute C. This guide chute has an upright receiving end and a horizontal delivery end so that the wafers while initially delivered thereto in horizontally spaced relation reach the delivery end in stacked or superimposed spaced relation for unloading by the mechanism E. This unloading mechanism E removes the vertically stacked wafers $a$ from the chute C to a position between the feed belts F and F'. These feed belts are formed with spaced grooved coacting faces for receiving and supporting the wafers delivered by the unloading mechanism E and delivering the same in step-by-step movement and in module form to the two soldering stations G and G'. Immediately prior to the movement of the stacks of ceramic wafers to the first or lower soldering station G, conductors or riser wires from a suitable supply are delivered to two opposite exposed sides of the ceramic wafers $a$. These conductor wires H and H' are soldered at the soldering station G to the opposite exposed marginal edges of the stacked ceramic wafers and the adjacent stacks are held together by the wires H and H' after they are soldered at station G. The coupled stacks of ceramic wafers are moved by the belts F and F' to the second or upper soldering station G' and prior to the delivery of the stacks to soldering station G' another set of riser wires are delivered to the opposite pair of side edges of the wafers indicated at J' and these additional wires are soldered at station G' and are moved from the station G' upwardly as interconnected stacks or module assemblies. A suitable supporting structure is provided for mounting the various parts of the assembly in their properly associated relationship, this frame structure primarily including suitably arranged uprights and horizontal supporting structures mounted on the uprights. A severing device Z (Fig. 3) is fixed to the output of the machine to receive the string of interconnected modules and separate them into individual units.

Feeding mechanism for supplying the wafers $a$ to the conveyor mechanism includes the loading magazine A show in Fig. 2, Fig. 19 and Fig. 20 and is in the form of an elongated vertical housing defined by side walls 1 connected by end walls 2. The side walls 1 are formed with spaced vertical grooves 3 defined by ribs 4, the ribs 4 being spaced so that the grooves are of sufficient dimension to permit free discharge by gravity downwardly of the ceramics which are arranged therein in vertically stacked position. The side walls 1 and end walls 2 are also so spaced that the dimensions between the grooves will permit free sliding movement of the ceramic wafers positioned therebetween, but it will be understood that the clearances are such as to maintain the ceramic wafers in aligned position for discharge into chute C by virtue of the escapement B. The end walls 2 of the loading magazine are secured to the side walls by screw bolts $2^a$, this permitting replacement of the grooved side walls with modified arrangements of grooves. It will be noted from an inspection of Fig. 22 that the size of the magazine permits the use of ceramic wafers which include sockets or other projecting elements as at $b$. The loading magazine A conforms in size and dimension to the top of the guide chute C upon which it is mounted (Fig. 19) and staggered dowel pins $2^b$ and $2^c$ fixed in the lower end wall of the magazine project in suitable sockets $4^a$ and $4^b$ in the top of the chute to align and secure the parts together in a manner permitting free passage of the wafers $a$ from the magazine A to the chute C. An angular stop has its shank 5 hinged at one end at 6 to the outer face of one side walls of the magazine A, while the free end 7 of the shank 5 is bent to define a supporting structure which projects through slot $7^a$ in the wall of the magazine to a position in the path of movement of the columns of wafers. This stop is normally urged outwardly by spring 8 mounted on pin 9 threaded into the magazine housing, the pin 9 extending through the shank 5 and terminating in a screw head $9^a$. A knurled nut 10 is freely mounted on pin 9 outwardly of shank 5 and is provided with a rounded projection 11 forming a cam for shifting the stop on its pivot when the nut 10 is rotated. The projection 11 normally seats in a socket opening $11^a$ in shank 5 when the stop is in inoperative position. By this construction a plurality of loading magazines may be utilized to secure maximum efficiency of the apparatus.

The guide chute C includes a vertical portion 12, a curved elbow 14 and a horizontal portion 15, whereby the wafers delivered from the stacking device A are translated from a vertical to horizontal position for movement by the unloading mechanism E to the feed mechanism F. By reference to Fig. 19 it will be seen that the guide chute C is formed internally with grooves $14^a$ defined by ribs $15^a$, and this structure corresponds identically to the grooves 3 formed in the stacking device A. The grooved portion of the feeding device in the upper removable section C' is shown as a separate part of the chute to facilitate manufacture of the parts and the escapement associated therewith. The main chute structure is formed of a pair of spaced bodies with their inner faces formed with parallel grooves $14^a$, these grooves forming the wafer trackways and being aligned with the grooves in the upper removable section C' and the magazine A. The upright outer end of the chute C is connected with the horizontal portion by an arcuate portion having such a radius as to permit free movement by gravity of the wafers $a$ traveling therein. The chute sections are mounted on the frame of the unloading mechanism and are rigidly braced by the U-shaped end clamps 16 and the medial clamp 17. The end clamps 16 are flanged as at $16^a$ to permit connection with the adjacent frame part, while the clamp 17 provides a guide spool mounting for one set of riser wires to be hereinafter described.

The number of grooves for receiving and feeding the ceramic wafers can be varied in accordance with requirements or a substantial number of these grooves may be provided and only a predetermined number be used for delivery in accordance with the design of the module. In the present disclosure seven grooves are provided in the stacking device A and chute C but the machine is illustrated in diagrammatic Fig. 2 as only using four of these grooves for forming a module assembly utilizing four ceramic wafers.

The ceramic wafers are delivered by an escapement mechanism B shown in detail in Figs. 18–22, inclusive. This escapement assembly is enclosed in a housing having side walls 30 and $30^a$, a top wall 31 and the bottom wall 32. The side wall 30 has internal reinforcement $31^a$ which extends outwardly of the housing and is bolted to the adjacent side walls of the chute section C' by bolts 31b. In the housing defined by the walls 30, 30a, 31 and 32 there is mounted a solenoid including a coil 33 and core 34 carried in the housing 35 secured to the wall 31 by means of screws or bolts 37. The core 34 reciprocates within a guideway generally indicated at 38 and at the end of this core there is a bifurcated terminal 39 which receives the reduced end 39a of the arm 40. The arm 40 is secured to the bifurcated end 39 by cross pin 41 and this arm has its outer end slotted as at 42 (Fig. 18) to receive the reduced terminal of plate 43 which is adapted to project through an elongated slot 43a in the guideway to a position between a series of the wafers, as best shown in Fig. 19, to support the column of wafers prior to their delivery into the mechanism. It will be noted that the elongated slot 43a through which the plate 43 projects is formed at the bottom in the inner wall of the removable section C' of the chute and upon which the escapement is mounted. A lever 44 is pivoted to the casing at 45 and to the pin 41, this lever terminating in a cross head 47 which is formed with a plurality of transverse slots 47a for mounting a plurality of pins 48, the pins 48 being individually mounted for axial movement through the openings 47a of the lever. The movement of the pins 48 is cushioned in each instance by the several coil springs 49, one of which is mounted on each pin and each of which is positioned between an outer sliding stop 50 and a lock washer 51, which latter abuts the inner ends of the spring and is positioned between the inner end of the spring and the adjacent face of the cross head 47. A lock washer 52 is provided at the outer end of each pin to prevent outward displacement of the pin. As seen from Figs. 18–21, inclusive, each of the pins is positioned and arranged for association with a slotted guideway in which the ceramic wafers travel and movement of the pivoted arm 44 by movement of the core 40 will result in these pins 48 being projected against the tension of their individual springs in a direction for engaging and clamping the ceramics positioned in the grooves. In the event all of the grooves are not occupied by ceramics, as proposed in the present disclosure, certain of the pins will follow the movement of their mounting lever but will merely project into the unoccupied grooves and have no function. Where the grooves are occupied by ceramic wafers the pins under movement of the lever 44 will move into engagement with the adjacent marginal edges of the ceramic wafers in the slots 42 and clamp them into position. The escapement movement is such that when the pins 48 are moved to clamp the ceramic wafers to secure them against discharge, the supporting plate 43 is withdrawn. This escapement mechanism permits a discharge of one set of ceramic wafers upon each movement of the solenoid and after the escape of one set of ceramic wafers, the plate 43 will again move under and support the descending column of wafers as they are released by the associated movement of the pins 48.

Upon each operation of the escapement mechanism B a set of ceramic wafers is released and moves by gravity through the chute C and this set of ceramic wafers will travel down to the horizontal portion 12 of the chute C where they are available for discharge by a mechanical ram E to their positions between the endless feed chains F. The delivery ram is illustrated in the present disclosure as manually actuated but could readily be operated by power means synchronized for movement and controlled by one of the terminal operations.

Figs. 16 and 17 show the details of construction of the manual ram which includes a trackway having a relatively heavy vertically arranged elongated plate 55 supporting an elongated track member 56 secured thereto by bolts 57, the heads of which are countersunk to provide clearance for the movement of the ram body. The trackway 56 has downwardly and inwardly inclined side faces 58 which are embraced by similarly shaped inner faces 59 of the ram body which is shown as generally of inverted channel form. The top surface 60 of the ram body is normally located below the bottom face of the horizontal portion of the chute C and carries at its forward end a removable L-shaped ram head 61 having upright portion 62 formed with a vertical face 63 for engaging the ceramic. The shank of the L-shaped head 61 is elongated to provide for the reception of bolts 64 which are used for securing the same to the ram body 60. An elongated tail piece 65 projects from the opposite end of the ram body and is secured thereto by the bolts 66 and from this tail piece 65 projects a vertical extension 65a to which is connected the handle member 67. A switch actuating element 68 is supported by brackets 69 for actuating control relays during operation of the ram as will be more fully hereinafter described.

The wafer conveying mechanism includes feed chains F which are each of identical construction and of the endless sprocket type with the links carrying the wafer-supporting blocks, which latter abut to form a continuous conveyor when the links are moving in a single plane. The wafer-supporting blocks are formed with uniformly spaced grooves or serrations and these grooves or serrations are constructed and arranged to conform to the spacing of the grooves in the chute C so that the wafers delivered from the chute C will register and seat in the grooves or serrations of the carrier blocks supported by the links of the endless chain. The structure of the individual links is shown in detail in Fig. 15 which is a section taken on line 15—15 of Fig. 7, this section showing the rivets supporting the carrier blocks and the pivotal pin connection between the links. The links each include a pair of spaced side plates 70 between which the carrier blocks 71 are mounted, the blocks being supported on pins 72 which extend through the base 73 of the blocks and through the side plates 70. The carrier blocks 71 have their outer faces formed with transverse serrations 74, and lateral wing portions 75 project from each side. The wing portions 75 rest upon the top flat marginal edge 76 of the side plates 70 of the link assemblies. The bases of the side plates 70 are each provided with lateral extensions 77 which are formed with aligned openings for receiving the pivot pins 78. The alternate links have their side plates 70 spaced for reception between the ears of the next adjacent link, such arrangement being illustrated in Fig. 15 wherein the spaced ears 77 of one link embrace the inwardly spaced ears 77a of the next adjacent link. It will be obvious that the bases 73 of the carrier blocks 71 are necessarily alternately reduced in thickness so that there will be no lateral displacement between the carrier blocks when they are associated together for receiving the wafers from the chute C. The pivot pins 78 connecting the links are provided with cylindrical bearings 79 the ends of which extend through enlarged openings 80 in the inner links and have their ends abut against the inner walls of the outer plates. The pins 78 have heads 78a at one end to hold the same against axial movement in one direction and cotter pins 78b lock the pins against axial movement in the opposite direction. Cylindrical rollers 81 are provided about the bearing 79, these rollers directly engaging with the teeth of the sprockets upon which the endless chains are mounted.

The two endless carrier chains or belts are mounted so that their grooved faces 74 are normally parallel between the upper and lower sprockets 83 and 82, the mounting of these sprockets being such that their axes are lying in the same vertical plane, thus insuring continuous parallel movement during feeding of the wafers from the feed chute C to a position above the first soldering station. This arrangement insures against escape or misalignment of the individual wafers which comprehend the groups defining the modules to be assembled. The sprockets and their associated operating parts, to be hereinafter described, are mounted upon and between spaced pairs of parallel depending plates 84 and 85, these plates being suspended by brackets 86 and 87 supported from beneath one of the supporting shelves 88 forming a part of the supporting structure. A cross brace 88ª extends between the depending bracket 86 and the side plate 84. It will be noted that the pairs of plates 84 and 85 are so spaced as to define a vertical slot or pathway 89 of a width substantially equal to the width of a wafer, this permitting the exposure of the notches in the wafers for association with the riser wires and the soldering apparatus.

The bottom portion of each pair of plates 84 and 85 are connected with outer plate extensions 90 and 91, respectively, these plate extensions 90 and 91, each being formed with a vertical recess 92 registering with the vertical slot 89 in the spaced plates 84 and 85. The bottom end portions of the plate extensions 90 and 91 are flared as at 92ª and formed with aligned openings 93 for mounting shafts 94 on which the sprockets 82 are mounted. The shafts 94 each have their ends mounted in bearings 95 arranged in the openings 93, the bearings 95 being provided with inner flanges 96 which abut the inner faces of the plate extensions 90 and 91. The sprockets 82 are spaced on their shafts 94 by spacer blocks 97 and lock rings 98 hold the shafts against displacement. The upper sprockets 83 are mounted on the parallel shafts 99 and 99ª mounted in bearings 100 in the depending plates 86 and 87 and locks rings 101 retain these shafts from axial displacement. The shafts 99 and 99ª each have one end projecting outwardly of the plate 87, these projecting ends being indicated by reference character 105 and mounting meshing gears 106, keyed thereto by keys 106ª, whereby the endless chains and their wafer supporting blocks are synchronized for simultaneous movement, thus insuring the horizontal arrangement of the wafers at all times.

The shaft 99 is the driven shaft and intermittent movement is transmitted to this shaft by the ratchet wheel 110 keyed thereto and intermittently operated by spring pressed pawls 111 and 112 carried by freely rotating pinion 114 operated by rack 115. The pinion 114 is mounted for rotation on bearing 116 secured to the shaft by pin 117.

Tension means for the wafer conveyor chains F and F' is provided by use of the adjustable angularly disposed arms 119 which are secured to the plate extensions 90 and 91 by the bolts 120 which extend through the adjusting slots 121 in the inner ends of the arms. These arms 119 each mount sprocket wheels 122 at their outer extremities for meshing engagement with the sprocket chain structure of the conveyor chains F and F'. By adjusting the arms 119 the conveyor chains can be tensioned.

Secured to the bottom of the platform 88 is a fluid motor cylinder 126, this cylinder 126 having outer end wall 127 with an inlet passage 128 therein connecting with fluid supply pipe 129. A second inlet 128ª is shown at the opposite end portion of cylinder 126 for reversing the movement of the piston. The inner end of the cylinder 126 is closed by cylinder block 130 having a bearing 131 through which the piston rod 132 travels during its actuation as the result of fluid pressure applied to the opposite ends of the piston through the fluid inlets 128 and 128ª. The piston rod 132 carrying piston 133 at one end has its opposite extremity 134 threaded and a rack connection 135 is screwed thereon. This rack connection includes a pair of spaced plates 136 between which is positioned the adjacent end of the rack bar 115, and these parts are fastened together by bolts 138. The rack bar 115 meshes with the gear 91 and the reciprocation of the piston 133 causes this rack bar to reciprocate to intermittently rotate the gear 83 through the associated pawl and ratchet mechanism 110 and 112. The movement of the piston 133 is cushioned by a fluid shock absorber or retarder, this structure including the cylinder 140 and the piston 141 arranged therein. The piston 141 is connected with the piston rod 142 and through the cross head 143 has a rigid connection with the main actuating piston rod 132 of the fluid power motor. The rigid link 143 has one end clamped between the rack connection 135 and the clamp nut 135ª on the threaded end of the piston rod 132. The other end of the rigid link 143 is clamped between the nuts 145 on the threaded extremity 146 of the fluid retarder piston rod 145. The cylinder 140 of the fluid retarder is normally filled with oil through a normally plugged opening at 140ª in the outer end 148 of the cylinder 140. The fluid in the cylinder 140 is bled through a by-pass 149 to opposite sides of the piston 141 and this by-pass is controlled by a needle valve 147. An indicator is provided for checking the fluid contents of the fluid retarder cylinder 140, this indicator being in communication with the cylinder 140 by means of a by-pass 151 in the head 148. The indicator includes a cylinder 152 in which is positioned a piston 153 having a piston rod 154. A spring 155 is mounted on the rod 154 between the end of the cylinder 152 and the adjacent end of the piston 153 to normally urge the piston to a position indicating the loss of fluid in the cylinder 140. The piston rod 154 extends through the end of the cylinder 152, as shown at 156, so that when there is loss of fluid in the cylinder 140 the piston 153, under urge of spring 155, will move to the right and indicate such fluid capacity loss, the reading being taken on the projecting part 156 of the piston rod which operates as a visual indicator. As is usual in the present form of retarder, the piston 141 is provided with a cylindrical recess 161 concentrically formed about the piston rod 142, this recess receiving the spring 162. A by-pass 163 is provided in the piston 141 and communicates with the right hand end of the cylinder 140 and with the recess 161. The recess 161 is valved by the plate valve 162, as best shown in Fig. 14.

The limit of movement of rack 115 is determined by the use of a plurality of stop blocks or abutments 168 which are calibrated to procure efficient operation, i. e. predetermined distance of travel of the conveyor chains. These stop blocks 168 are contained in a chamber of rectangular form supported on the bottom of panel 88, this chamber being supported in the path of movement of the rack 115. The chamber has bottom wall 169, side walls 170 and open end 171 for the movement of the rack 115 therein, and the reinforced end 172, which latter receives the impact when the end of the rack abuts the block 168. The reinforced end wall 172 is formed with a transverse passageway 173, this passageway 173 being restricted by a neck 174 to define an inner cylinder 175 and an outer cylinder 176. In this passageway is the switch actuating rod 177 which actuates the limit switch 303. The rod 177 is provided with an enlargement 179 positioned within the cylinder 176 and outwardly of the restriction 174, this structure providing for the limited movement of the rod 177. The block 168 is formed with a transverse passageway aligned with the passageway in the reinforced end wall 172. This passageway in the block 168 has a medial restriction at 180 defining a pair of spaced chambers in which the actuator rod 181 is located, this actuator rod having a spring in the outer end of the abutment 180, the spring operating against the enlarged head 182. The opposite end of the rod 181 is provided with an abutment 183 which engages the end of the push rod 177 actuating the switch 303. By this structure and with the use of blocks 168 of different dimensions, the actuation of the stop switch 303 can be caused to occur at predetermined intervals to thereby arrange the wafers supported in the conveyors at appropriate levels.

The belts F and F' which are intermittently actuated by the pawl and ratchet indexing means heretofore described will operate in sequence to the movement of the ram E in accordance with the timing mechanism actuated through switches associated with the ram. The circuitry utilized in this connection will be more fully hereinafter described, it being sufficient at this time to state that the ceramic wafers discharged by the ram E from the chute C readily move between the spaced grooves in the two vertically moving faces of the feed belts F and F' and are carried by such belts between riser wires H and H' supplied from a suitable source, these riser wires being guided by the spools 167 and 168ª vertically and in spaced relation for registry in the vertically aligned notches of the spaced ceramics and in contact with the solder provided in the notches. The ends of the riser wires H and H' are initially manually threaded in the apparatus and are arranged in vertical spaced relation with their terminals looped over the notches 169 in the cross link 169ª which are supported by the plates 84 and 85 and extend across the slot between these plates at a point positioned above the first soldering station. There are a pair of such links 169ª, one at each side of the frame, to fasten the upper ends of the two groups of riser wires in proper position at the two exposed sides of the wafers supported in the conveying mechanism. With the riser wires H and H' so positioned with respect to the opposite faces of the groups of modules which are in seating engagement with the slots 166 in the feed belts 165 the assembly progresses to the first soldering station G where the riser wires are soldered to the ceramic wafers at all point of intersection by soldering heads G and G' shown in detail in Figs. 26 to 32.

There are two soldering stations, the first soldering station G being positioned to solder the riser wires to the ceramic wafers at their points of contact, as defined by the notches in the wafers and at the opposite sides of the wafers which are free from engagement with the carrier belts F and F'. The second soldering station G' is positioned above the carrier belts F and F' and at this second station the riser wires J and J' are soldered to the notches on the opposite sides of the ceramic wafers which were previously seated in the horizontal slots of the carrier belts, it being obvious that such notches will be freely exposed after the module groups have left the carrier belts. It will also be obvious that when the module groups have left the belt they are held in their associated spaced relations by the first set of riser wires which have been soldered to the ceramic wafers at the lower station G.

Obviously there are four sets of riser wires, these sets of riser wires being indicated in the disclosure of Fig. 2 by reference characters H, H', J and J'. In the disclosure, each set includes three wires, this number corresponding to the number of soldered notches in each side of the ceramic wafers. The number of riser wires will be determined by the structure of the module to be assembled and the structure of the module, of course, will determine the number of soldered notches in each of the ceramics forming the module. The riser wires are supplied from a plurality of spools L, these spools being mounted on a rack formed by corner uprights 184 supporting a plurality of open trays 184ª, the bottom of the trays being formed of spaced angle irons 184ᵇ each of which has one arm arranged horizontally, as shown in Fig. 33, to support spool supporting plates 184ᶜ. The spools L are mounted on cores 185 secured in position by vertical bolts 185ª extending through the horizontal arm of the angle iron 184ᵇ and spool supporting plates 184ᶜ. The spools L are clamped against rotation by cross arm 185ᵇ secured in position by the fixed head 185ᶜ secured by cross pin 185ᵈ at a point generally medial of the bolt 186. The lower end of the bolt 186 is threaded with the core 185, whereby rotation of the nut 185ᶜ will cause the cross arms 185ᵈ to secure the spool L against rotation. On the bolt 186 above the head 185ᶜ is rotatably mounted a spool 186ª to which is bolted by bolts 186ᵇ the traversing arm 187, this traversing arm having its outer end portion projecting downwardly below the head of the spool coil L for convenient unwinding of the riser wire, which latter is threaded about a guide roller 187ª mounted in the end of the traversing arm. The clamp bolts 186ᵇ also secure in position the angular guide arm 188 which is of generally U-form with its lower arm secured to the spool 186ª. The upper arm of this guide arm is provided with a guide roller 188ª for receiving the riser wire from the guide roller 187ª in the traversing arm 187. The guide roller 188ª has its transverse axis intersecting the axis about which the coil of riser wire rotates. From the roller 188ª the riser wire is guided about guide roller 189 mounted in an adjustable block 189ª supported in the rack. From the guide roller 189 the riser wire is conducted about appropriate guide rollers for association with the module.

All of the soldering heads are identical in construction and each pair of soldering heads is oppositely positioned to work simultaneously on opposite edges of the wafers forming the module assembly. In view of the foregoing it will only be necessary to describe the mounting of a single pair of soldering heads and the structure of one of the heads. In other words, the pairs of heads are each provided with similar mountings and operating mechanism and each of the heads is constructed in the same manner.

Figure 5:
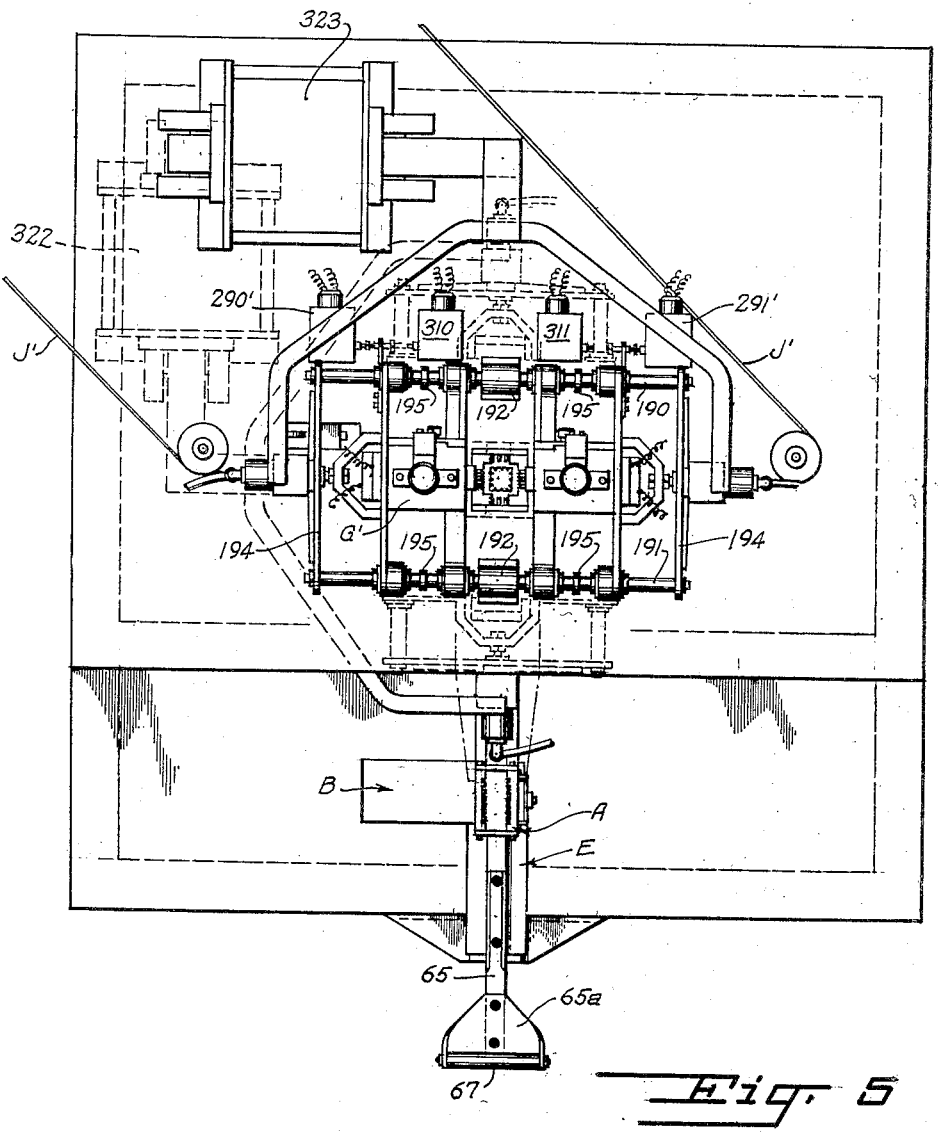
Fig. 5 is a top plan view of the machine.
Figure 6:
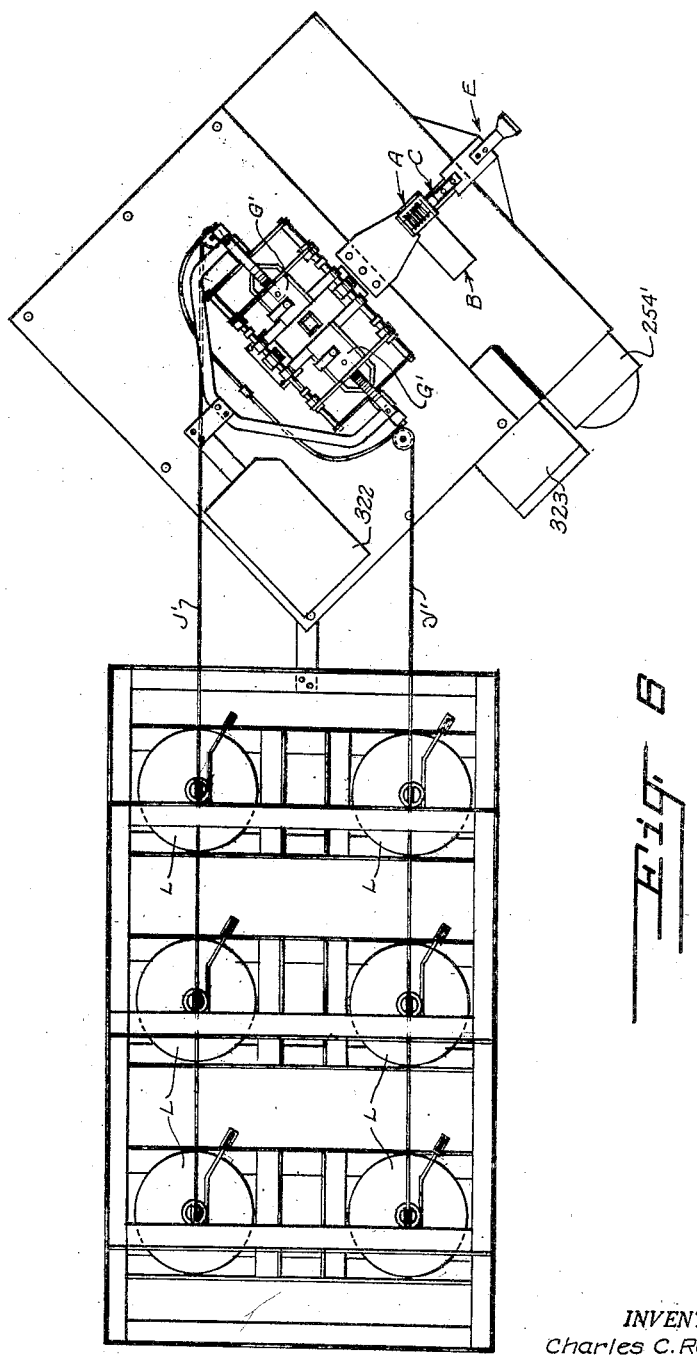
Fig. 6 is a top elevation of the assembly.
Figure 7:
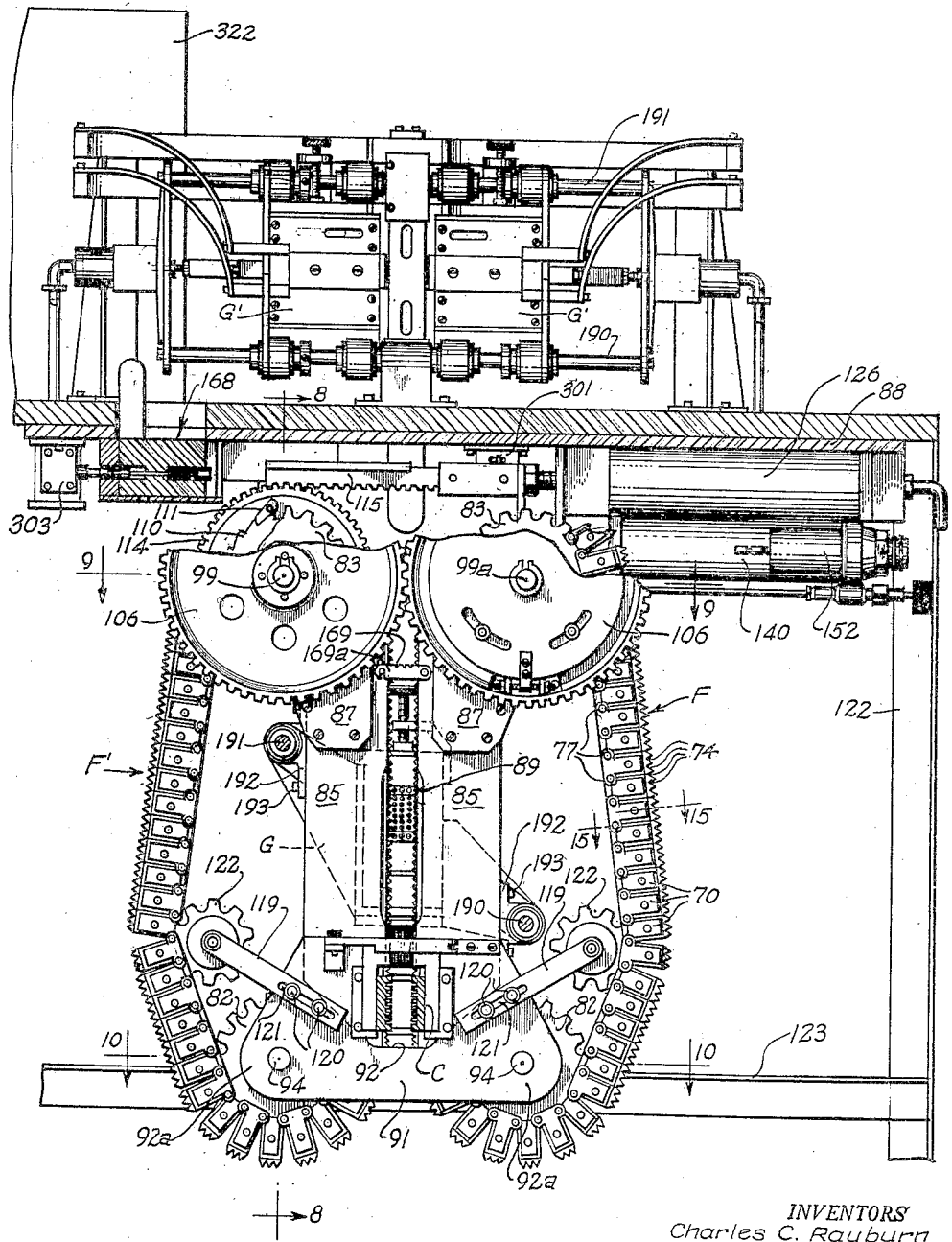
Fig. 7 is a partial elevation showing the conveyor mechanism and the top soldering heads.

Referring now to the mounting for the soldering heads, it will be seen by an examination of Figs. 5, 7 and 16 that the mountings for each of the heads consists of a pair of laterally spaced diagonally arranged guide rods 190 and 191, these guide rods being held medially of their length by brackets 192 fixed to the opposite side edges of the adjacent frame portions by screws 193 or other suitable fastenings. The outer ends of the rods are connected by cross heads 194, these cross heads being provided with centrally formed openings for the passage of piston rods which are associated with the power means for reciprocating the soldering heads. The guide rods 190 and 191 are provided with annular stops 195 which are adjustable along the length of the rods 190 to define the limit of movement of the soldering heads in the direction of the module.

Upon the guide rods 190 and 191 are mounted the carriages carrying the soldering equipment of a soldering head, the carriages each including an angular bracket having a base portion 198 and a back portion 199, the back portion being at substantially right angles to the base. The base 198 is formed with a centrally located opening 200 while the back 199 is formed laterally of its center and on its inner face with a relatively wide slot 201 defined by the spaced walls 202. The base 198 is provided with forwardly projecting ears 203 and 204 which terminate in cylinders 203ª and 204ª the cylinders being formed with axially aligned openings 205 in which are located roller bearings 206, shown in Fig. 16, the roller bearings being constructed and arranged for mounting on the lower guide rod 190 to facilitate the transverse movement of the heads by the fluid motor. The back portion 199 of the bracket is provided with corresponding ears 207 and 208, these ears mounting the cylindrical casings 209 and 209ª in which another set of roller bearings 206 are arranged for association with the upper guide rod 191. The ears 203 and 207 are formed on a separate side plate 210 which is secured to the side edges of the main bracket structure 198—199 and this side plate 210 is formed with a recess defined by a bottom wall 211 and side walls 212 and 214. The side plate 210 is braced by shear plates 215 which extend between the side wall and the back of the body of the bracket. An elongated slot 217 extends vertically from the recess 201.

A soldering head assembly is mounted on the bracket of each soldering head, the structure of the soldering head being shown in Figs. 26, 27, 30 and 31. Fig. 27 is an exploded view showing the separate elements comprising the soldering head, which embodies an upper soldering head section M and a lower soldering head section N, these two soldering sections being spaced by an intermediate cooling assembly which also functions to insure contact between the riser wires and the soldered notches in the ceramic wafers. The upper soldering section M includes an insulated plate 225 of general U-shape form with the arms of the U uniformly spaced to provide for the free movement of the conductor pins 226. The front end of the conductor pins 226 are mounted in the base 225ª of the U-shaped plate and the spaced cross member 225ᵇ. The rear end of the pins 226 are mounted in the flange 228ª of the second insulated plate 228, the flange having openings 230 aligned with pin openings in the parts 225ª and 225ᵇ. The second plate 228 is secured by screws 229ª to the top of the first plate 225 and is formed with opening 235ª to facilitate passage of cooling air in the unit. Coil springs 229 are mounted on the conductor pins 226 to normally urge the pins into contact with riser wires during the soldering operation.

For supplying current to the conductor pins 226, a copper conductor plate 231 is positioned rearwardly of the insulated plates and is supplied with terminal connections 232. The inner face of conductor plate 231 is notched as shown at 233 to receive the bent-down extremities 234 of flexible connectors 235 which have their inner extremities 236 connected with the conductor pins 226, as best shown in Fig. 26. The outer ends of the flexible connectors 235 are screwed to the conductor plate 231 by screws 237. By this construction the current is supplied to the conductor pins 226 through the connections 232, flexible connections 235 and 236. This type of connection permits the notched ends 226ª to firmly engage the riser wires and to be moved axially under pressure. The lower soldering head section N is similarly constructed with the second insulated block 228 on the lower face of the assembly and with the flange 228ª of this insulated plate projecting upwardly rather than downwardly as in the soldering section M. Other than this, these parts are identical and have identical reference characters.

Intermediate the soldering head sections M and N is the cooling and hold-down assembly whereby the riser wires are firmly positioned against the solder carrying notches of the wafers during heating and subsequently cooled by conduction and ventilation. This cooling structure comprises a body 240, this body having flat upper and lower faces which abut against the adjacent faces of the plates 225 of the soldering sections. The body 240 is formed of insulation material and has dimensions corresponding to the soldering sections to facilitate the assembly and housing. The body 240 is recessed at its forward face 241 and an opening 242 is formed rearward of the recess. A front plate 243 is secured to the front end of the body 240 and covers the recess in the forward face 241. The plate 243 is formed with a central extension 244. This extension is formed with parallel openings 245 which form guideways for the cooling pins 246. Similar openings 245ª are formed in the neck portion 247 of the body which separates the recess 241 from the opening 242, this neck 247 forming a support for the inner ends of the cooling pins 246. Springs 246ª engage abutments 246ᵇ and normally urge the pins outwardly to insure their engagement with the riser wires during operation. A plate 250 is fixed to one side of the body 240 by screws 250ª and projects above and below the same so as to engage the side edges of the soldering head sections when the parts are assembled. A screw 251 projects from the opposite face of the body 240, this screw, when the parts are assembled, extending through the vertical slot 217 in the bracket, whereby a thumb screw can be used to clamp the parts together. Upper and lower shell sections 252 and 253 complete the assembly, these sections including top and bottom plates 252ª and 253ª and side walls 254 inwardly shaped to provide for maximum ventilation and freedom of movement of the flexible connectors 235 as shown in Fig. 26. The upper shell section 252 is formed with lateral openings 252ª to permit the free passage of air through the head, the air being supplied from a pump through openings 253ᵇ in the bottom shell section 253.

It will be obvious from the foregoing that the present structure permits convenient interchange of parts to accommodate the device in the assembling of modules having a different number of ceramic wafers or modules in which the wafer structure per se is modified with respect to the number of soldered notches. The upper soldering head section M is secured to the upper shell section 252 by screw bolts 260 which extend upwardly through the soldering head section M and into the shell section body, while the lower soldering head section N is secured to the lower shell section 250ª through the screw bolts 260ª which project downwardly through the soldering head section N and into the lower shell section body. Additional fastenings in the form of screw bolts 261 project through the upper shell section and into the lower soldering head section N, there being threaded openings 261ª provided in the latter structure to receive the screws 261. Corresponding screw bolts 262 extend through the lower shell section into the lower soldering head section N and the latter has the threaded openings 262ª for receiving the screw bolts 262, as best shown in Fig. 27. The upper shell 252 is provided with a wear plate 263 to receive the thrust from the clamp bolt 211, as shown in Fig. 29.

Referring now to Fig. 16, the cross head 194 is shown as mounting the lower section 265 of a fluid pressure cylinder 266 in which there is a piston 267 operating by fluid pressure from the fluid line 268 against the tension of a spring 269 on the piston rod 270, between the piston 267 and the end wall of the cylinder section 265. This piston rod 270 operates through the cross head 194 and applies pressure to the soldering head bracket to cause it to slide on the guideways 190 and 191 to move the soldering head into operative position with the soldering rods and hold-down rods in engagement with the riser wires and against the ceramic wafers forming the module assembly. The connection between the piston rod 270 and the bracket mounting the soldering heads is best shown in Figs. 5 and 26 and includes a threaded end 271 on the end of the piston rod 270 which is adjustably connected by bolts 272 to the yoke 273 fixed to the bracket.

Figure 36:
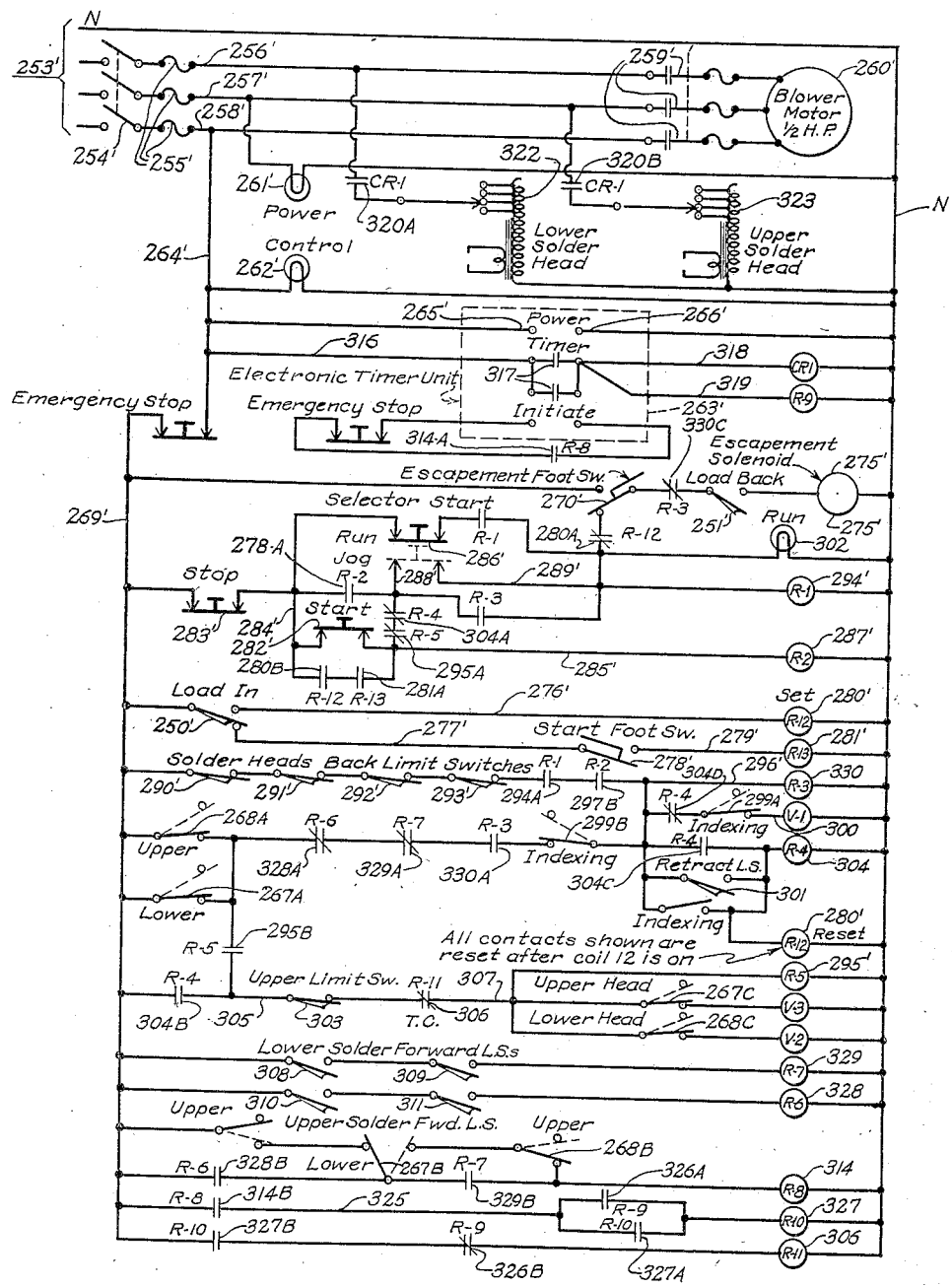
Fig. 36 is a diagram of the control circuit.
Figure 40:
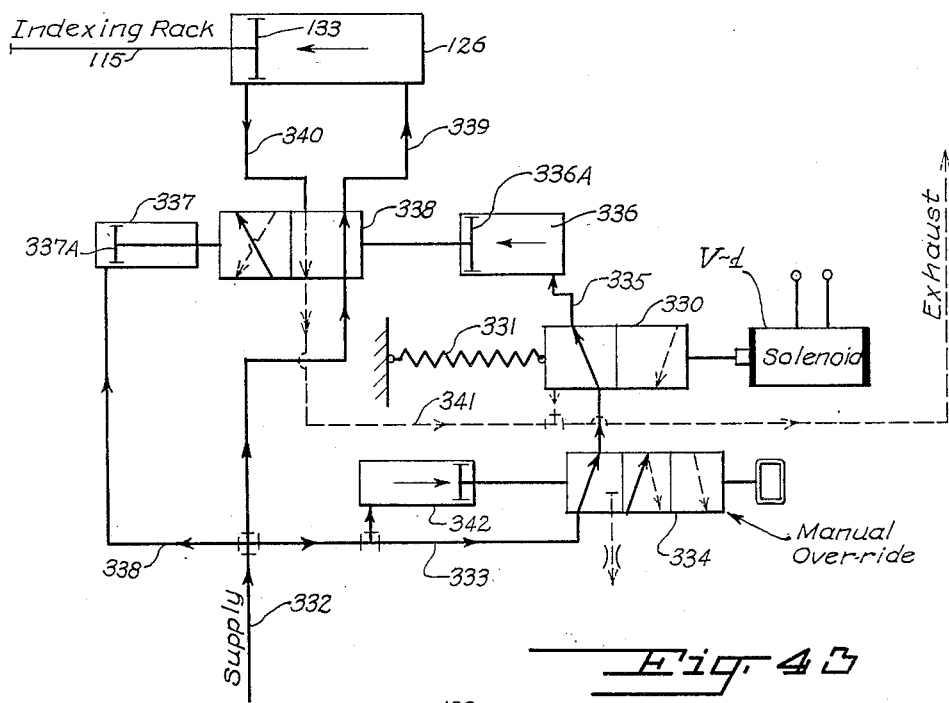
Fig. 40 is a wiring diagram of the loading ram.
Figure 40A:
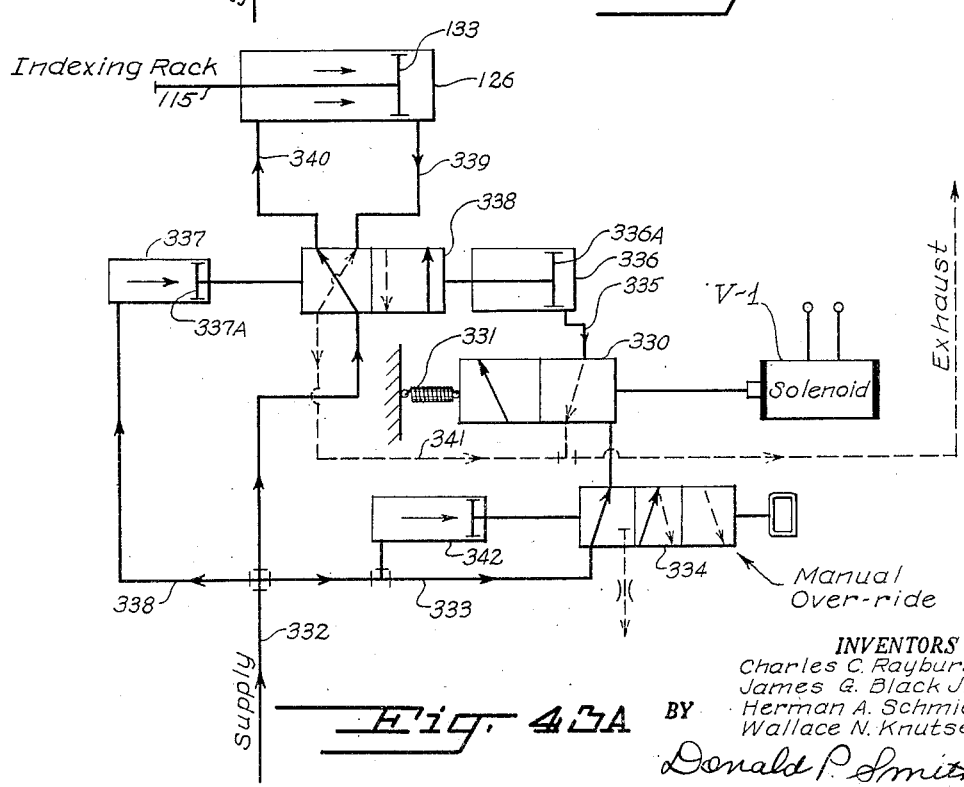

A control circuit (Fig. 36) is provided whereby the various functions of the module assembler are performed in properly timed sequence with only nominal attention from the operator. Thus, once the machine has been threaded and is filled with module arrays as shown in Fig. 2, all operations are performed automatically in response to the manually actuated strokes of the loading ram E by actuation in its forward and rearward terminal positions of switches 250' and 251', respectively. In general the control relays are sequenced by the actuation of limit switches acting on other of the reciprocating elements of the machine; in particular, of the indexing rack and of the upper and lower soldering heads. A proper dwell time of the soldering heads in their extreme positions is provided by the use of an electronic timer unit 263'. Pneumatic cylinders are used to provide the reciprocating motion of the solder heads and indexing motor.

In the following description the various components of the control circuit (Fig. 36) will be mentioned in the order in which they are utilized in actual threading and operation of the assembler. At the outset of operation, power is applied to the control unit from the three phase, four wire A. C. source 253' by manual closing of three pole switch 254'. Fuses 255' of capacity appropriate to the normal current to be drawn from each phase of the source are connected in series with the poles of switch 254'. Two pilot lamps are provided to indicate the application of power to the system, 261' connected to terminal 275' indicates that power is available for one soldering heater transformer 323, the other 262' connected to terminal 258', for the control circuit in general.

In the assembly operation, solidification of the molten solder is hastened by application of a flow of air over the solder head area; this flow also serves to cool the pressure cooling pins or heat conducting rods 246 from the heating incident to contact with the electrically heated riser wire. Power for a blower motor 260' which powers an air pump or blower for this function is applied directly through the closing of switch 254'. A thermally actuated overload protector 259' is provided in the blower motor circuit, but barring its actuation, the blower motor 260' operates continuously throughout the duty time of the assembler.

The electronic timer unit 263' provided for the solder heat control is warmed up preparatory to operation of the assembler by the closing of switch 254' by its connections from terminal 258' through line 264' to terminal 265', returning from terminal 266' directly to ground conductor N'.

The starting operation, which will now be described, is predicated upon the manual threading of the support or riser wires from the several supply spools L through the various pulleys and guides. Suitable switching means are provided to bypass the automatic controls for the soldering heads until the work column is loaded from the entry chute to the first soldering station G. In the control circuit this by-pass is accomplished by opening switches 267A, 267B and 267C to disconnect the lower soldering head and 268A, 268B and 268C for the upper soldering head. The manually controlled loading ram E is then retracted to its extreme position and escapement foot switch 270' is depressed; the actuation of switches 251' and 270' complete a circuit for energizing the wafer escapement solenoid 275' by connection from power line 269' through foot switch 270', normally closed contact 330C of relay R-3, through the solenoid 275' and thence to ground wire N'. Upon actuation of the escapement solenoid, a set of wafers falls into the horizontal region of chute C where they are collected and forced into registering slots in the conveyor belts by the forward (manual) stroke of loading ram E. In its forwardmost position, the loading ram displaces switch 250', thereby disconnecting the start foot switch 278' and setting relay switch R-12 set by completing a circuit from power line 269', through conductor 276' and back to ground N'. By setting relay R-12 with partial retraction of the loading ram the escapement is prevented from operating by the opening of control 280A of relay R-12, unless foot switch 270' is depressed. With partial retraction of the loading ram E, switch 250' again connects power line 269' to conductor 277', so that with momentary depression of foot switch 278', relay R-13 is energized via conductor 279' to ground N'. Contact 280B of relay R-12 and 281A of relay R-13 are connected in series so that closing of both (requiring coinciding retraction of ram E and depression of foot switch 278') is necessary for operation of the indexing motor unless start switch 282' is closed for continuous operation. With closing of solenoid contacts 280B of R-12 and 281A of R-13 relay R-2 is energized from power line 269' through stop switch 283', conductors 284' and 285', returning to ground N'. Relay R-2 is held on by its own contact 287A through normally closed contacts 304A of relay R-4 and 295A of relay R-5. Relay R-1 is energized from conductor 284' by depression of selector start switch 286' in its jog position connecting through the now closed contact 287A of relay R-2, conductor 289' to R-1 and returning directly to ground N'.

With both soldering heads in retracted position, series connected limit switches 290', 291', 292' and 293' are closed, and through these and now closed contacts 294A of relay R-1 and 297B of relay R-2, relay R-3 is energized from power line 269' through conductor 296', returning to ground N'. It is held on by its contact 330A.

Similarly actuated is solenoid valve V1 from conductor 296' through normally closed contact 304D of relay R-4, closed index switch 299A, and returning to ground N'. The actuation of valve V1 connects air pressure to the indexing cylinder causing a stepwise advance of the conveyor chains F and F'. A pilot lamp 302 is provided to indicate the actuation of relay R-1 and thus of the completion of one of the necessary connections for advance of the indexing mechanism. The normally closed contact 330C is inserted in the escapement solenoid circuit to prevent release of wafers while indexing is in progress.

The indexing motor is restored by release of the selector start switch 286' from its jog position. Subsequent loading of wafer stacks and stepwise advancing motion of the indexing ram is continued by the above described sequence of operations until a wafer stack is at the lower solder station G.

For commencement of the soldering process and automatic operation, manual switches for the lower soldering head 267A, 267B and 267C, and manual switches 268A, 268B and 268C for the upper soldering head are closed, and selecto-start switch 286' is placed in its "run" position.

With these preliminary steps, advance of the indexing motor piston to its forward position closes limit switch 303 and thereby energizes relay switch R-5 and solenoid valves V2 and V3 by connection from power line 269' through contact 304 of relay R-4, conductor 305, normally closed contact 306 of relay R-11, conductor 307, directly to relay R-5 and through switch 267C to valve V3 and 268C to valve V2, thence returning all to ground N'. Energization of valves V2 and V3 applies air pressure to the four pneumatic cylinders for the four solder heads. Upon reaching the work position in the solder head strokes, series connected limit switches 308 and 309 for each of the lower heads and 310 and 311 for each of the upper heads are closed, thereby applying power to relays R-7 and R-6, respectively. Opening of contacts 328A of relay R-6 and/or 329A of R-7 removes the power from the indexing motor solenoid valve V1, previously held on by contact 330A of relay R-3, thus allowing the indexing ram to retract preparatory of a new stroke. The series connected contacts 328B of relay R-6 and 329B of relay R-7 apply power from line 269' to relay R-8, contact 314A which is used to initiate the timed heater action by the electronic timer 263'. It will be noted that manual switches 315, 268A and 267B are provided to permit operation of the timer for soldering even if only one soldering head is being utilized.

The relay contact 314A of relay R-8 initiates the timer cycle, applying power for a preset interval from conductors 264' and 316, through internal timer-contacts 317 simultaneously to relay CR1 through conductor 318 and to relay R-9 through conductor 319, thence both returning to ground N'. Of the contacts of relay CR1 connecting power to the soldering transformers, contact 320A connects from power line 256' to transformer 322 energizing the lower head, while contact 320B connects from power line 257' to transformer 323 powering the upper solder head. The other relay R-9 energized for a preset interval connects relay R-10 from power line 269' through contact 314B of relay R-8 and conductor 325. Contact 327A of relay R-10 holds itself on after 326A is opened. Contact 327B of relay R-10 is then closed so as to energize relay R-11 through the closing of normally closed contact 326B of relay R-9 when the timing cycle is completed. Actuation of relay R-11 after completion of the timed cycle of heating opens the normally closed contact 306 thereby disconnecting power from R-5, V3 and V2, thereby allowing the soldering heads to retract.

From the above description it will be appreciated that this cycle of loading, indexing and soldering will be repeated for as many as the demand for a specific module will require by a repetition of the control actions as paced by the manual reciprocation of the loading ram and foot switch actuation by the operator and the time requirements for automatic indexing and soldering.

In the foregoing description of the control circuit, it was noted that energization of solenoid valve V1 initiated the forward stroke of the indexing rack and that removal of power to V1 allowed its retraction. The arrangement of pneumatic lines, valves, and servo pistons by which this motion is accomplished is shown schematically in Fig. 43 for the forward position and in Fig. 43A for the retract position of the indexing rack. In these, and subsequent diagrams of the control system for the solder heads, the arrows indicate the direction of air flow in the lines; the solid lines indicate air under pressure, while the dashed lines indicate exhaust or low pressure air. The proper functioning of the indexing rack servo piston 126 requires a flow of air so substantial that direct actuation of a control valve by a solenoid is not feasible. Consequently servo system operated by the solenoid valve V1 drives a larger valve which in turn controls the air flow to and from the indexing rack servo piston.

Considering now Fig. 43 showing the forward rack position, solenoid V1 is energized retracting valve 330 and tensioning spring 331, thereby connecting air under pressure from supply 332 through line 333 through manual over-ride valve 334, valve 330, line 335 to servo piston 336. Air under pressure is simultaneously present on servo piston 337 through line 338 from supply 332, but the effective area of piston 336A is made sufficiently greater than that of piston 337A so that the equilibrium position is to the left when both cylinders 336 and 337 receive the same pressure. In the left hand position, valve 338 connects air under pressure to cylinder 126 through line 339, forcing the piston 133 to the left. The other side of piston 133 is vented to the atmosphere through line 340, another port of valve 338 and exhaust line 341. As a result of these motions, the indexing rack is advanced.

When the power is removed from solenoid valve V1, the conditions shown in Fig. 43A are created, initiated by the restoration of valve 330 by the energy stored in spring 331. In its left most position, valve 330 exhausts the air from servo cylinder 336, allowing piston 337A to unbalance and move valve 338 to the right, thereby connecting air under pressure to the left side of piston 133 and exhausting the right side. With this connection, the indexing rack is retracted and the one cycle is completed.

The manual over-ride valve 334 is normally urged into the position shown by the pressure in servo cylinder 342. However, this pressure can be overcome by the operator should manual actuation of the pneumatic servo system for the indexing rack be desired.

Figure 43B:
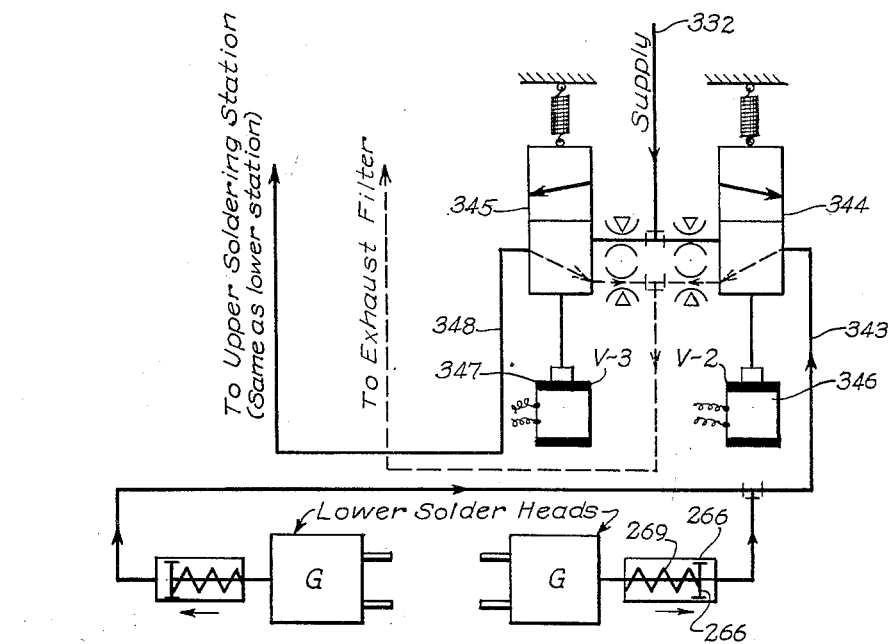
Figure 43C:
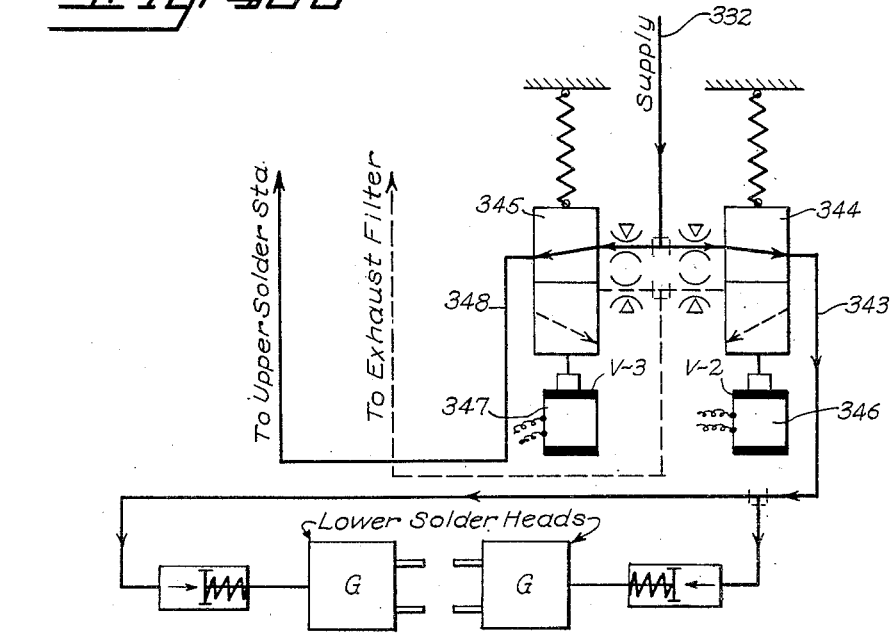

For the solder head pneumatic control system, Fig. 43B shows the conditions existing when the soldering heads are retracted by the action of springs 269. Here the pressure on the working side of pistons 267 is vented to the atmosphere through line 343 and the port of valve 344 which is urged into the position shown by springs 346. A similar valve 345 and spring 347 perform an identical function for the upper soldering head connected through line 348. When the solenoid valves V2 and V3 are energized, the valves are urged into their lowermost position (Fig. 43C) tensioning springs 346 and 347 and connecting air under pressure from supply 332 via ports in valves 344 and 345 to lines 343 and 348, respectively, serving thereby to advance the soldering heads into soldering position. The air pressure acting on servo piston 267 is sufficient to compress the restoring springs 269 which are provided to effect subsequent retraction of the heads.

Figure 1:
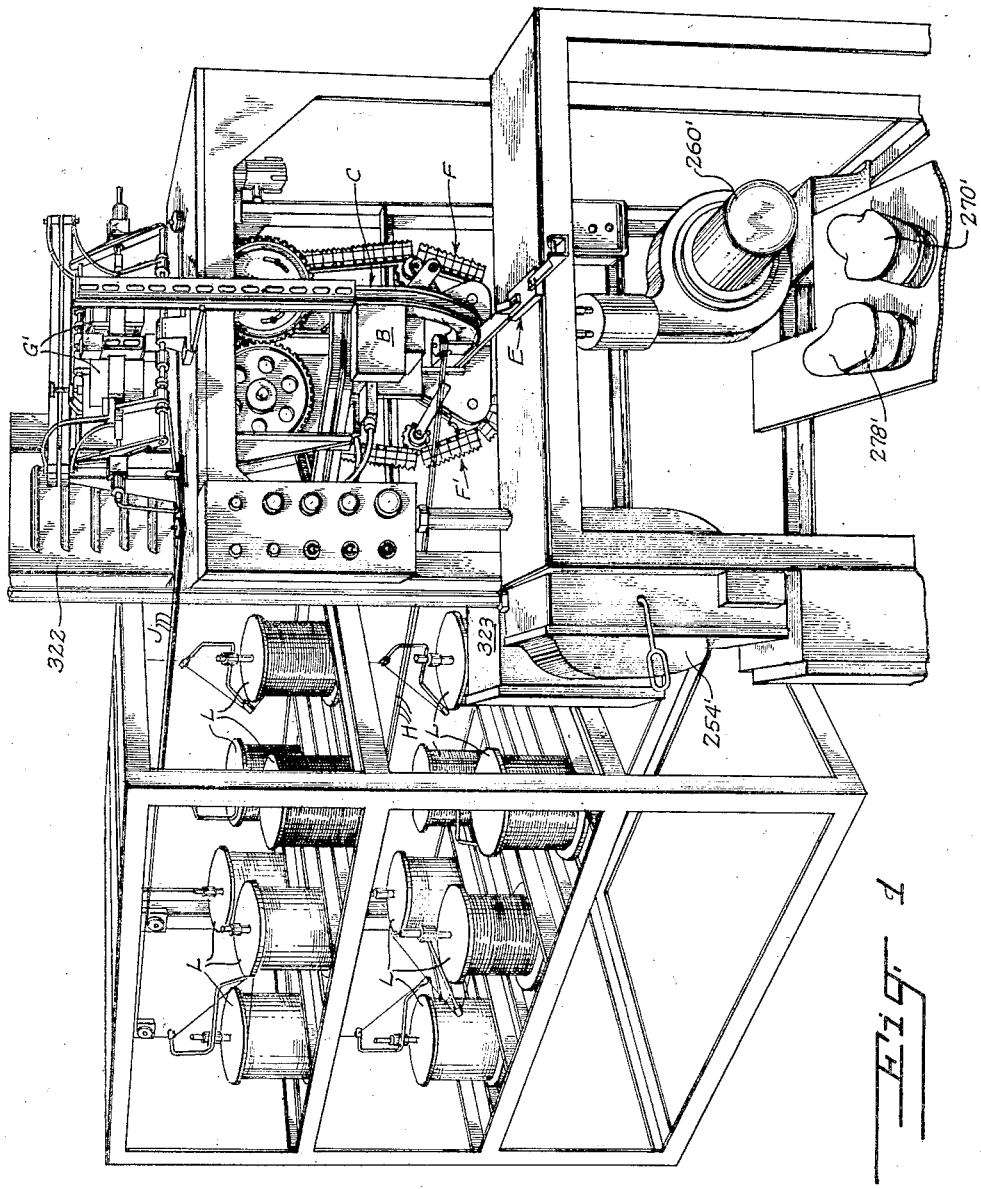
Fig. 1 is a perspective view loking at the front of the machine.

In the first form of the invention as embodied in Figs. 1 to 44, inclusive, the mechanical sequence of operation will be more obvious by an inspection of Fig. 2. In this figure the chute C which translates the ceramic wafers in group form from vertical to horizontal position is loaded from a magazine indicated by reference character A. This magazine A may be loaded with any suitable groups of ceramic wafers as required by the production of a predetermined module assembly. The loaded magazine is attached to the top of the chute C and the ceramic wafers in suitable arrays or groups as determined by the module structure are released intermittently through an escapement mechanism indicated by reference character B, this escapement mechanism being controlled by circuiting through a foot switch 270′ under control of an operator. The operation of the escapement B delivers a series of ceramic wafers containing suitable circuitry to the lower horizontal part of the chute C where they are moved by the manually actuated ram E between the intermittently actuated endless conveyor belts F and F′. The guide slots in the chute C and in the magazine A are so constructed and arranged that the ceramic wafers when delivered therefrom to the endless conveyors are properly spaced in parallel relation for permanent connection by riser wires, which latter are furnished in oppositely arranged groups from a suitable supply provided on spools L, as best shown in Fig. 1. The number of riser wires furnished in each group corresponds to the number of solder carrying notches along one edge of each ceramic wafer. It will, of course, be understood that initially the free ends of the riser wires are first threaded into their appropriate positions, as shown and described, these positions being such that the initial soldering operation will form a connection between the riser wires and the first group of ceramic wafers. The ram E which functions to remove the ceramic wafer groups from the chute C is shown as manually actuated but obviously could be operated from any suitable power source in a manner providing essential sequence of operation with respect to the other operating parts of the assembly. At each end of the ram E are switches, these switches being actuated to close control circuits upon operation of the ram. The circuitry actuated by the movement of the ram is fully described supra, it being essential, however, that the controls permit the feeding of the wafers in groups without the actuation of the soldering heads in order that the parts will be properly positioned with the heads before the heating of the heads occurs.

As the groups of wafers are intermittently delivered to the endless conveyors F and F′ they will be carried vertically between these conveyors until the first group of ceramics are in a position for application of the first set of riser wires at the first soldering station. The guides for the riser wires position the same immediately adjacent the soldered notches of the ceramics, it being understood that each ceramic is provided with predetermined circuitry and impedance which is connected to solder deposits at the notches of the wafers. With the first group of ceramic wafers to form a module in position between the first pair of oppositely positioned soldering stations G—G, the soldering heads are reciprocated by fluid motors 267, these motors being actuated from electronically controlled valves. The soldering heads at the soldering stations have two separate functions, i. e. they complete a circuit through the riser wires for heating the same at the area defined by the ceramic array, and then cool the soldered joints after the soldering operation and prior to the retraction of the heads. The soldering heads, by virtue of their construction, provide for a clamping action between each riser wire and each solder joint and the clamping means because of its structure provides a heat conduction which facilitates the cooling. The conducted heat from the clamping rods is dissipated by a cooling medium, such as air, supplied from a suitable source. After the functioning of the soldering heads at the first soldering station, the operation is continued intermittently in sequence with the actuation of the ram which, as previously stated, is delivering to the conveyors the array of modules for the different assemblies.

The soldering operation at the first soldering station results in a soldered connection between each riser wire and each of the wafers so that a unitary assembly is provided capable of movement free of the conveyors. Further motion of the conveyor then delivers the module arrays with their attached riser wires towards the next soldering station G'—G', this station being positioned above the endless conveyors, the functioning of which is no longer essential due to the connections between the riser wires and the modules as provided for by the soldered joints therebetween. Inasmuch as the riser wires not only connect the individual wafers of each module but also the several module assemblies, the latter will continue to move as a connected assembly above the conveyor belts and will present their opposite sides free of the conveyors for connection with the additional riser wires J and J' which are delivered to the free sides of the modules. The second soldering station G' functions in the same manner as the first soldering station, but the soldering heads are positioned at the opposite sides of the module structures so that the additional riser wires are then soldered to the remaining two sides of the wafers.

The foregoing operation is brought about by the operation of the endless conveyors, the conveyors being intermittently actuated by a fluid motor 126, shown in Figs. 12 and 13. The motor 126 actuates a rack bar and the pawl and ratchet mechanism of Fig. 11 to simultaneously advance the two associated conveyors a predetermined distance as defined by gauge blocks 168 at the end of the stroke of the rack 115. The limit of movement of the conveyors upon each stroke of the motor 126 can be changed by substitution of blocks 168, the latter also functioning as a switch actuator for operating the stop switch 303. The module assemblies after the riser wires have been attached to their four sides by the two sets of soldering heads move as a unit upwardly from the second soldering station and can then be severed individually or in groups by an automatic cutting mechanism shown at Z. The cutting mechanism may be of any type as long as it functions to sever at a proper time all of the riser wires so as to completely sever the individual units or groups of units as required. The control of the cutting mechanism will be synchronized for operation from any of the automatically controlled parts of the machine, as for instance by retraction of the second soldering heads. The control of the severing device may also be done by the definition between two limit switches of the series of wafers.

It will be understood that many changes in details can be made to accommodate the machine in the formation of modules having different specifications. For instance, in a module in which a connector is attached to one of the end wafers, it is essential that the ram be notched as at y in Fig. 25 to clear the terminal wire of the connector. It will also be noted in this figure that the ram head is provided with additional notches y' which straddle the solder deposits at the notches in the ceramic wafers. This is desirable as there may be a tendency for the solder deposits to be dislodged by the action of the ram if it struck directly the solder deposit.

Attention is now directed to Fig. 45 which illustrates a modification of the modular assembler described above. This species is directed to an organization in which the modular stack is fabricated in a horizontal plane and the operation is a continuous one thereby eliminating the periodic approach and retreat of the soldering heads and the intermittent operation of the conveyor. The drawing is in substantial schematic form and portions thereof are omitted or shown in phantom to further the cause of clarity of illustration. To the left of the figure is shown a chute 361 having grooves 362 formed therein to slidably guide a plurality of series of wafers in edge supported relationship onto the serrated segments 364 of conveyor 363. The discharge mechanism described and illustrated in the above embodiment can be depended upon to urge the wafer series from the mouth of the chute onto the serrations to there be carried in progression toward the several soldering locations. Since the motion of the conveyor belt is continuous and the wafers have a longitudinal dimension it is necessary that the wafer group be projected at high velocity from the mouth of the chute, which projection is easily accomplished with modern high speed relays; and it is important that clearance be provided at the ends of the grooves to prevent binding between the wafers and the groove ends by conveyor motion. It will be understood that an identical belt having serrations opposed to the illustrated serrations is provided as shown in the former embodiment, so that the wafer series are secured in a vertical plane for transport. Gear 365 drives the conveyor from shaft 366 keyed thereto, and idler gears 367 and 368 maintain the belt in the proper planar arrangement and provide a tensioning adjustment.

An array of three conductive wires 369 are fed from storage spools (not here shown), past guide 371 and applied in a vertical plane along one edge of the wafer series substantially as shown. A like array of three conductive wires 370 emerges from a battery of storage spools (not shown) and is threaded past wire guide 372 to be applied in a plane coincident with the opposing edge of the wafer series for later attachment thereto. Similar arrays of wires 373 and 374 are fed from storage spools and threaded past guides 375 and 376 to lie in opposed plane in contact with the upper and lower edges of the wafers. It is apparent that the wafer series are surrounded by an array of a total of twelve conductive wires, three on each side and disposed perpendicular to the planes of the wafers. The wires, or risers are available to serve as mechanical supports and electrical interconnections between components carried on the wafer surfaces when the module is connected into an electronic circuit.

The first soldering station comprises a pair of opposed soldering heads 377 forming a passage for the wafers; the heads consisting essentially of housings containing electrical heating elements and having grooves formed in the faces thereof to receive the conductive risers. Rails 379 pass through apertures formed in the housings to slidably support the same for translation. A bar 380 extending between the housings secures them for motion together, and a switch 382 arranged in the path of travel of the wafer series is recessed in the face of the head for a purpose that will hereinafter be more fully explained.

The second soldering station or assembly comprises a similar pair of opposed soldering head housings 382 and 383 fastened together by a bracket 384 which is in turn secured to bar 380 by a rod 385 thereby insuring that motion of either pair of housings imparts identical motion to the other pair. A guide rail 386 pierces the housing 382 and a limit switch 387 is disposed thereon for engagement and actuation by the housing upon riding over the same. Leads 388 are depended upon to conduct electrical energy to a heating element. Grooves 389 are formed in opposing faces of the soldering heads and a rail 390 pierces an aperture formed in housing 383 to support the same for motion in a horizontal plane. A switch 391 is fixed in the face of housing 383 for coaction with switch 382 as will later be more fully explained. A pneumatic piston 391 is supported, for example on the frame of the machine, and has a supply pipe 392 secured thereto to admit a fluid under pressure and has electrical leads 393 to control an internal solenoid valve. A rod 394 interconnects between the pneumatic piston and housing 377 substantially as shown whereby to impart motion to the several groups of soldering heads upon actuation of the solenoid valve. The cylinder 391 is of any well-known construction and it is not deemed necessary to illustrate the details here. As is well understood by those skilled in the art a solenoid is arranged to open and close a valve to admit external pressure to one side of a piston to thereby cause motion thereof and a spring is depended upon to return the piston and rod to its initial position. A cutting device (not shown) is arranged at the output of the module stack to sever the elongated conductors between wafer series and thereby form individual modules. This cutting device may take many forms, a simple and effective type being a series of shearing jaws, in number in accordance with the number of conductors, having normally open jaws positioned to permit the passage of the conductors and responsive to a signal such as the reclosing of switch 387 when the housing 382 reverses its motion to close and sever the conductors. Or an oxidizing flame may be directed against the conductors to rapidly sever them to thereby separate the completed module from the assembly string.

The operation of this species is as follows: With the chute 361 filled with prepared wafers and the several wire assemblages threaded into position, torque applied by any suitable means such as an electric motor to shaft 366 will produce clockwise rotation of conveyor belt 363, and of course an identical and mating conveyor belt. When the series of wafers 392 are discharged from the mouth of the chute they take their position within the serrations and are moved along between the first array of threaded wires. Upon arrival of a series of wafers at the first soldering station the wires are pressed between the wafer edges and the housing faces and are drawn therewith, and switch 382 will be closed by pressure of the wafers against the same. Since a series connection of switches is illustrated in Fig. 46, the closing of either switch 382 or switch 391 has no effect upon the circuit; but upon simultaneous arrival of two series of wafers at the two soldering stations switches 382 and 391 will be closed, thereby energizing the heating elements of the soldering heads and the solenoid valve of plunger 391. Upon opening the solenoid valve pressure is admitted to the cylinder through inlet 392 and thrust is imparted to the coupled soldering heads through rod 394. The velocity of travel of rod 394 is selected to exactly match the velocity of the conveyor 363 so that the heads accompany the wafers and conductors sandwiched in the passages between them and no relative motion exists between the wafers and conductors and heads. The soldering cycle now takes place and upon head 382 reaching a predetermined position at limit switch 387 and opening the same the heating element and solenoid valve will be simultaneously disconnected from the source of voltage. The spring contained within the cylinder 391 will rapidly return the groups of soldering heads to their initial positions and it is a simple matter of selecting the spacing between the series of wafers to have the soldering heads embrace the wafers at the proper time and repeat the cycle. Obviously the drawing has been lengthened considerably to clearly illustrate the embodiment; in practice the wafer series are close together to avoid excessive wire between wafer series. The cutter thereafter separates the string into individual modules which are now ready for test and assembly into a printed circuit panel.

What we claim is:

1. In a module assembling machine, means for intermittently feeding a plurality of groups of spaced ceramic wafers to soldering stations, each of said wafers having areas containing deposits of solder, means for feeding and applying conductors into position to engage the soldered areas of said ceramic wafers, means for holding the conductors in contact with said soldered areas, means for heating the conductors at said soldering stations, and means controlled by the intermittent feeding mechanism for actuating said heating means.

2. In a module assembling machine, means for intermittently feeding to soldering stations a plurality of groups of parallel ceramic wafers having marginal areas containing deposits of solder, means for feeding and applying conductor wires into position for connecting the soldered areas of said ceramic wafers, means at said soldering stations for intermittently applying heat to said conductor wires, and means for synchronizing the intermittent feeding means with the intermittent heating means.

3. In a module assembling machine, wafer holding means, means for feeding a plurality of wafers into spaced parallel relation in said holding means, each of said wafers including spaced solder holding areas, means for arranging strips of conductor material in position for connecting solder areas of at least a pair of said wafers, and means for heating said conductors to soften said solder to attach said conductor material to the solder areas.

4. In a module assembling machine, means for feeding a plurality of groups of spaced ceramic wafers to soldering stations, each of said wafers having areas containing deposits of solder, means for applying conductors to the soldered areas of said ceramics, means for holding the conductors in contact with said soldered areas, movably mounted means for heating the conductors at said soldering stations, and means for controlling the feeding mechanism by movement of the heating means.

5. In a module assembling machine, means for simultaneously feeding a plurality of flat ceramic wafers in spaced parallel relation, conveyor means formed with spaced horizontal grooves arranged in the path of movement of said wafers and receiving the same from said feeding means, power means for intermittently moving the conveyor to a plurality of stations, means for positioning riser wires against opposite sides of said wafers as they approach said stations, soldering means at said stations having automatic controls associated with the conveyor means for soldering the riser wires to said wafers at their points of intersection with said riser wires, and means for cooling the soldered joints prior to movement of the wafers from said station.

6. The structure of claim 5 characterized in that the plurality of flat ceramic wafers are delivered to the conveyor in spaced groups from the feeding means.

7. The structure of claim 5 characterized in that the flat ceramic wafers are provided about their marginal edges with spaced deposits of solder and the riser wires set against the solder deposits.

8. In a module assembling machine, means for simultaneously feeding a plurality of flat ceramic wafers in spaced parallel relation, endless conveyor means formed with spaced horizontal grooves arranged in the path of movement of said wafers and receiving the same from said feeding means, power means for intermittently moving the endless conveyor means to a plurality of stations, means for positioning riser wires against opposite sides of said wafers as they approach said stations, soldering means at said stations having automatic controls associated with the endless conveyor means for soldering the riser wires to said wafers at their points of intersection with said riser wires, and means for cooling the soldered joints prior to movement of the wafers from said stations.

9. In a module assembling machine, means for simultaneously feeding a plurality of flat ceramic wafers in spaced parallel relation, conveyor means formed with spaced horizontal grooves arranged in the path of movement of said wafers and receiving the same from said feeding means, power means for intermittently moving the conveyor means to a plurality of stations, means for positioning riser wires against opposite sides of the wafers as they approach said stations, soldering means at said stations having automatic controls associated with the conveyor means for soldering the riser wires to said wafers at their point of intersection with the riser wires, said soldering means including reciprocating heads having a plurality of fingers for securing the riser wires in position against said ceramic wafers during soldering, and current conducting means including spaced contacts for engaging the riser wires outwardly of the wafers included in the module.

10. In a module assembling machine, means for simultaneously feeding a plurality of flat ceramic wafers in spaced parallel relation, said wafers being provided about their marginal edges with spaced deposits of solder, conveyor means formed with spaced horizontal grooves arranged in the path of movement of said wafers and receiving the same from said feeding means, power means for moving the conveyor means to a plurality of stations, means for feeding riser wires against opposite sides of said wafers and against said solder deposits as they approach said stations, soldering means at said stations having automatic controls associated with said conveyor means for soldering the riser wires to said wafers at their point of intersection with the riser wires, said soldering means including reciprocating heads having a plurality of fingers for securing the riser wires in position against said solder deposits on said ceramic wafers during soldering, and current conducting means including spaced contacts for engaging the riser wires outwardly of the wafers included in the module.

11. In a module assembling machine for assembling flat ceramic wafers in association with riser wires forming electrical connections therebetween, said wafers being provided about their marginal edges with spaced deposits of solder, conveyor means including a pair of spaced movable members formed with horizontal grooves for receiving said wafers, power means for moving said conveyor means to a plurality of stations, means for feeding riser wires against sides of said wafers and against said solder deposits as they approach said stations, soldering means at said stations having automatic controls associated with said conveyor means for soldering the riser wires to said wafers at their point of intersection with the riser wires, said soldering means including reciprocating heads having a plurality of fingers for securing the riser wires in position against said solder deposits on said ceramic wafers during soldering, and current conducting means including spaced contacts for engaging the riser wires outwardly of the wafers included in the module.

12. In a module assembling machine for assembling insulators in the form of flat ceramic wafers having electrical impedance mounted thereon in association with riser wires forming electrical connections therebetween, said wafers being provided about their marginal edges with spaced deposits of solder having electrical connection with said impedance, conveyor means including a pair of spaced movable members formed with horizontal grooves for receiving said wafers, power means for intermittently moving said conveyor means to a plurality of stations, means for feeding riser wires against the sides of said wafers as they approach said stations, soldering heads at said stations, said soldering heads including a plurality of independently movable members for securing the riser wires in position against said solder deposits on said ceramic wafers, and current conducting means including spaced contacts for engaging the riser wires outwardly of the wafers included in the module.

13. In a module assembling machine for assembling insulators in the form of flat ceramic wafers having electrical impedance mounted thereon in association with riser wires forming electrical connections therebetween, said wafers each being provided about their marginal edges with spaced deposits of solder having electrical connection with said impedance, conveyor means including a pair of spaced movable members formed with horizontal grooves for receiving said wafers, power means for intermittently moving said conveyor means to a plurality of stations, means for feeding riser wires against the sides of said wafers as they approach said stations, soldering heads at said stations, said soldering heads including a plurality of spring pressed plungers for engaging and urging said riser wires against said solder deposits on said ceramic wafers, said spring pressed plungers being mounted in a block of insulation carried by said heads, contact members engaging said riser wires at points outwardly of the wafers included in said module, and a source of current connected with said contact member.

14. The structure of claim 13 characterized in that manually actuated means are provided for supplying a predetermined number of ceramic wafers to said conveyor means.

15. The structure of claim 13 characterized in that the riser wires are fed to a pair of opposite sides of the wafers at each of the stations.

16. The structure of claim 13 characterized in that the riser wires are supplied to predetermined sides of the wafers at each of said stations and after soldering at the first station form a connection spacing and supporting the wafers as they move to a second station.

17. The structure of claim 13 characterized in that the soldering heads are mounted in oppositely positioned pairs and are simultaneously moved to operating position by power means.

18. The structure of claim 13 characterized in that the soldering heads are mounted in oppositely positioned pairs and are simultaneously moved to operating position by hydraulic means controlled by automatic mechanism.

19. The structure of claim 13 characterized in that soldering heads are arranged in oppositely positioned pairs at two spaced stations, whereby the soldering of the riser wires to the wafers is at opposite sides of the wafers at the two stations.

20. In a module assembling machine for assembling insulators in the form of flat ceramic wafers having electrical impedance mounted thereon in association with riser wires forming electrical connections therebetween, said wafers each being provided about their marginal edges with spaced deposits of solder having electrical connection with said impedance, conveyor means including a pair of spaced movable members formed with horizontal grooves for receiving said wafers, power means for intermittently moving said conveyors means to a plurality of stations, means for feeding riser wires against the sides of said wafers as they approach said stations, soldering heads at said stations, said soldering heads including a plurality of spring pressed plungers for engaging and urging said riser wires against said solder deposits on said ceramic wafers, said spring pressed plungers being mounted in a block of insulation carried by said heads, contact members engaging said riser wires at points outwardly of the wafers included in said module, a source of current connected with said contact members, and means for air cooling said plungers including air ducts in said insulation and means for forcing air through said ducts.

21. In a module assembling machine for assembling flat ceramic wafers having electrical impedance mounted thereon in association with riser wires forming electrical connections therebetween, said wafers each being provided about their marginal edges with spaced deposits of solder having electrical connection with said impedance, conveyor means including a pair of spaced movable members formed with horizontal grooves for receiving said wafers, power means for moving said conveyor means to a plurality of stations, means for feeding ceramic wafers to said moving conveyor means including a channelway having aligned inwardly facing grooves, said channelway having a horizontal portion adjacent its exit end, an elongated slot in the horizontal portion and a ram for moving the ceramic wafers from the grooves in said channelway to the horizontal grooves in said conveyor means, means for feeding riser wires against the sides of said wafers in said conveyor means as they approach said stations, soldering heads at said stations, said soldering heads including a plurality of spring pressed plungers for engaging and urging said riser wires against said solder deposits on said ceramic wafers, said spring pressed plungers being mounted in a block of insulation carried by said heads, contact members engaging said riser wires at points outwardly of the wafers included in said module, and a source of current connected with said contact members.

22. The structure of claim 21 characterized in that the conveyor means is moved intermittently to the plurality of stations.

23. The structure of claim 21 characterized in that means are provided for securing the riser wires to said conveyors to provide simultaneous initial movement of the riser wires with the ceramic wafers.

24. The structure of claim 21 characterized in that the riser wires are supplied from spools mounted for free rotation in a carrier, and guides are furnished between the spools and the conveyor means to direct the riser wires into the path of movement of the conveyor means.

25. The structure of claim 21 characterized in that the soldering heads at the stations are slidably mounted on guide rods and means are provided for moving said soldering heads on said sliding rods at predetermined intervals.

26. In an apparatus of the character described, a frame, a conveyor including a pair of spaced conveyor elements having inwardly facing aligned grooves mounted on said frame, means for intermittently moving the conveyor elements in a single direction with the grooves remaining in their aligned position, a pair of inwardly facing soldering heads, said soldering heads being arranged at each side of the conveyor for engaging elements carried between the spaced conveyor elements, and means for feeding groups of spaced articles to the aligned grooves in said conveyor elements, said means including a channelway formed with aligned grooves throughout its length, the channelway including an upright portion and a horizontal portion, means for controlling the movement of articles in said channelway positioned at the upright portion, reciprocating means for discharging articles from the horizontal portion of said channelway to the aligned grooves in said conveyor elements, means feeding riser wires against the side edges of the articles in the grooves of said conveyor elements prior to their movement to said soldering heads, and means carried by said soldering heads for holding said riser wires against said articles during the intervening periods of their movement.

27. The structure of claim 26 characterized in that the horizontal portion of the channelway is provided with an elongated open ended slot and the reciprocating means for discharging the articles from the channelway includes a portion engaging the articles through said slot.

28. The structure of claim 26 characterized in that the spaced conveyor elements are of the endless type and include inwardly facing parallel moving portions.

29. The structure of claim 26 characterized in that the spaced conveyor elements are of the endless type and include inwardly facing parallel moving portions, and a second pair of inwardly facing soldering heads are positioned above the conveyor elements associated with the articles after the operation of the first pair of soldering heads.

30. The structure of claim 26 characterized in that diagonally arranged guide rods are supported in the frame and the soldering heads are slidably mounted on the guide rods and are actuated by fluid motors.

31. In an apparatus for assembling a plurality of ceramic wafers having circuitry mounted thereon into module form, said apparatus including power actuated conveyor means for holding ceramic wafers in spaced parallel relation, means for positioning a plurality of riser wires adjacent the marginal edges of said ceramic wafers, means for forming soldered joints between the riser wires and ceramic wafers, means for cooling the soldered joints, said cooling means including a plurality of heat conducting rods, and means for holding said rods into contact with said soldered joints for a predetermined period.

32. The structure of claim 31 characterized in that ventilating means are provided for the heat conducting rods.

33. The structure of claim 31 characterized in that the means for holding the heat conducting rods into contact with the soldered joints for a predetermined period reciprocates and controls the operation of the conveyor means when moved in one direction by actuation of a switch controlling a motor driving said means.

34. The structure of claim 31 characterized in that the riser wires are arranged in groups, which groups are positioned adjacent predetermined marginal edges of the ceramic wafers and the soldered joints between the riser wires and ceramic wafers are formed progressively during the operation of the power actuated conveyor means.

35. The structure of claim 31 characterized in that the riser wires are arranged in groups, which groups are positioned adjacent predetermined marginal edges of the ceramic wafers and the soldered joints between the riser wires and ceramic wafers are formed progressively and intermittently during the operation of the power actuated conveyor means.

36. The structure of claim 31 characterized in that the riser wires are supplied from a source including fixed spools and means are provided for feeding the wires from the spools for association with the ceramic wafers.

37. The structure of claim 31 characterized in that the means for forming the soldered joints between the riser wires and the ceramic wafers and the means for cooling the soldered joints are mounted in a unitary structure which is movable toward and away from the ceramic wafers by means synchronized with the movement of the power actuated conveyor means.

38. The structure of claim 31 characterized in that the means for forming the soldered joints between the riser wires and the ceramic wafers and the means for cooling the soldered joints are mounted in a unitary structure in connected pairs which are simultaneously actuated by power means for engagement with the riser wires at opposite sides of the ceramic wafers.

39. In a machine for assembling flat ceramic wafers having electrical impedance mounted thereon in association with riser wires forming electrical connections therebetween to form modules, said wafers being provided about their marginal edges with spaced deposits of solder having electrical connection with said impedance, a supply means for delivering a plurality of ceramic wafers in spaced parallel relation, a conveyor for said wafers, manually actuated means for transferring the wafers from said supply means to said conveyor, power means for intermittently moving the conveyor to a plurality of stations, a source of supply for said riser wires, means for positioning an end portion of said riser wires adjacent the solder deposits of said spaced wafers, soldering heads at said stations, said soldering heads including a plurality of spring pressed elements for engaging said riser wires to hold the same against said solder deposits, spaced contacts at each side of said elements for delivering current to said riser wires for heating the same, whereby soldered joints are formed between said wires and said deposits, means for reciprocating said soldering heads to and from working position, and indexing means for actuating said conveyor intermittently after each soldering operation.

40. The structure of claim 39 characterized in that the manually actuated means for transferring the wafers from the supply means to the conveyors operates electrical means sequentially actuating the soldering heads and the indexing means.

41. The structure of claim 39 characterized in that the spring pressed elements for engaging the riser wires for holding the same against said solder deposits are in the form of elongated rods of heat conducting material and function to conduct the heat from the soldered joints for cooling the solder.

42. The structure of claim 39 characterized in that the spring pressed elements for engaging the riser wires are formed of heat conducting material and have portions extending into a duct formed in the soldering head and open to the passage of cooling air from a blower.

43. The structure of claim 39 characterized in that the spring pressed elements for engaging the riser wires and the spaced contacts at each side of the spring pressed elements are independently movable and adjustable.

44. The structure of claim 39 characterized in that means are provided for holding the spring pressed elements into engagement with the riser wires after the soldering operation for conducting the heat from the soldered joints.

45. The structure of claim 39 characterized in that the power means for intermittently moving the conveyor is actuated by the movement of the manually actuated means for transferring the wafers.

46. The structure of claim 39 characterized in that soldering heads are arranged in pairs at spaced points along the conveyor, the pairs of soldering heads operating sequentially.

47. The structure of claim 39 characterized in that the source of supply for the riser wires comprises a plurality of spools carried in a support and each spool is provided with an unwinding mechanism.

48. In a module assembling machine, a conveyor, means to move said conveyor at a uniform velocity, means for feeding to said conveyor a plurality of series of spaced wafers having edge areas containing deposits of solder, means for feeding and applying an array of elongated conductors to the wafer edge areas and normal to the planes of the said wafers, a first station to heat the solder in selected edge areas, a second station to heat the solder in the remaining edge areas, means for moving said first and second stations in unison to accompany said conveyor for a predetermined distance, and means for returning said stations to an initial position.

49. In a module assembling machine, a conveyor, means to move said conveyor at a uniform velocity, means for feeding to said conveyor a plurality of series of spaced wafers having edge areas containing deposits of solder, means for feeding and applying an array of elongated conductors to the wafer edge areas and normal to the planes of the said wafers, a first station comprising two mutually opposed heads arranged to heat the solder in selected edge areas, a second station comprising two mutually opposed heads arranged to heat the solder in the remaining edge areas, means for moving the said first and second stations in unison to accompany said conveyor for a predetermined distance, and means for returning said stations to an initial position.

50. In a module assembling machine, a conveyor, means to move said conveyor at a uniform velocity, means for feeding to said conveyor a plurality of series of spaced square wafers having edge areas containing deposits of solder, means for feeding and applying an array of elongated conductors to the wafer edge areas and normal to the planes of the said wafers, a first station comprising two spaced heads forming a passage for said wafers and confronting opposite wafer edges, a second station comprising two spaced heads forming a second passage for said wafers and confronting the remaining wafer edges, means to conduct electrical energy to the respective heads to heat the solder, means responsive to arrival of respective wafer series at the said stations to move the said stations in unison at conveyor velocity and initiate application of electrical energy to the said heads, and means responsive to arrival of the said stations at a predetermined point to initiate return motion thereof and terminate the application of electrical energy.

51. In a module assembling machine, a conveyor, means to move said conveyor at a continuously uniform velocity, means for feeding a plurality of series of spaced square wafers in edge supported relationship to said conveyor, each of said wafers having peripheral areas containing deposits of solder, means for feeding and applying an array of elongated conductors to the peripheral areas and normal to the planes of the said wafers, a first apparatus comprising two spaced heads defining an elongated passage for said wafers and confronting opposite wafer edges, a second apparatus comprising two spaced heads defining an elongated passage concentric with said first recited passage for said wafers and confronting the remaining wafer edges, means to support the said first and second apparatus for translation together, means to conduct electrical energy to the respective heads to heat the solder, means responsive to the arrival of wafer series within the said passages to translate the said first and second apparatus in unison at conveyor velocity and to initiate application of electrical energy to the said heads, and means responsive to translation of the said first and second apparatus to a predetermined position to initiate return translation thereof and interrupt the electrical energy supply.

52. In a module assembling machine, means for periodically feeding to soldering stations a plurality of series of spaced insulating wafers having peripheral solder areas, means for feeding and applying an array of elongated conductors to said areas and perpendicular to the planes of the wafer series, means for heating the conductors at the soldering stations to bond the conductors to the wafers and form a string of modules, whereby severance of the conductors provide separate individual modules.

53. The structure of claim 52 characterized in that the means for heating the conductors at the soldering stations includes a plurality of soldering heads automatically moved to and from operative position by power means.

54. The structure of claim 52 characterized in that the means for heating the conductors at the soldering stations includes oppositely positioned pairs of soldering heads which are automatically actuated by fluid motors in response to movement of the feeding mechanism.

55. The structure of claim 52 characterized in that the means for heating the conductors at the soldering stations includes oppositely positioned pairs of soldering heads which are automatically actuated by fluid motors in response to movement of the feeding mechanism and cooling means are provided for cooling the soldered joints.

56. The structure of claim 52 including means for severing the conductors to separate individual modules from the string.

57. In a module assembling machine, means for feeding a plurality of series of spaced insulating wafers, a conveyor arranged to receive and conduct the wafers to soldering stations, a succession of peripheral areas having solder deposits on each respective wafer, means for feeding and applying an array of elongated conductors to the solder deposits and perpendicular to the planes of the several wafer series, means for heating the conductors and solder deposits at the soldering stations to bond the conductors to the wafers and form a module string, said conductor array being severable in planes between respective wafer series to separate individual modules from the string.

58. In a module assembling machine, means for feeding a plurality of series of spaced insulating wafers, at least some of said wafers carrying electrical components, a succession of peripheral areas having solder deposits on each respective wafer, a conveyor arranged to accept and transport at uniform velocity the said series of wafers from the said feeding means, a plurality of soldering stations disposed adjacent the path of motion of said conveyor, means for feeding and applying an array of elongated conductors to the solder deposits and perpendicular to the planes of the several wafer series, means for heating the conductors and solder deposits at the soldering stations to bond the conductors to the wafers and form a module chain, said conductor array being severable in planes between respective wafer series to separate individual modules from the string.

59. The invention as set forth in claim 54 including soldering heads at said soldering station arranged to advance to and retreat from the conductor array.

60. The invention as set forth in claim 54 including soldering heads at said station arranged to translate in a path parallel to the motion of said conveyor and to move at conveyor velocity in one direction.

References Cited in the file of this patent

UNITED STATES PATENTS

| | | |
|---|---|---|
| 2,397,052 | Schietinger | Mar. 19, 1946 |
| 2,762,903 | Brimley | Sept. 11, 1956 |